(12) United States Patent
Shimura et al.

(10) Patent No.: US 8,676,464 B2
(45) Date of Patent: Mar. 18, 2014

(54) VEHICLE CONTROL SYSTEM

(75) Inventors: Soichiro Shimura, Susono (JP); Hitoshi Matsunaga, Anjou (JP); Kazuya Okumura, Mishima (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/579,659

(22) PCT Filed: Mar. 18, 2011

(86) PCT No.: PCT/JP2011/056550
§ 371 (c)(1),
(2), (4) Date: Aug. 17, 2012

(87) PCT Pub. No.: WO2012/042935
PCT Pub. Date: Apr. 5, 2012

(65) Prior Publication Data
US 2012/0316744 A1    Dec. 13, 2012

(30) Foreign Application Priority Data

Sep. 29, 2010  (JP) ................................. 2010-218727

(51) Int. Cl.
*B60T 8/17* (2006.01)
*B60T 8/172* (2006.01)
(52) U.S. Cl.
USPC ............................................. 701/72; 700/70
(58) Field of Classification Search
None
See application file for complete search history.

(56) References Cited

U.S. PATENT DOCUMENTS

| | | | | |
|---|---|---|---|---|
| 4,528,860 A | * | 7/1985 | Barr | 74/52 |
| 5,549,343 A | * | 8/1996 | Blazer | 295/34 |
| 2005/0015191 A1 | | 1/2005 | Banno et al. | |
| 2005/0200088 A1 | | 9/2005 | Sawada et al. | |
| 2009/0192675 A1 | * | 7/2009 | Yamakado et al. | 701/38 |
| 2009/0216415 A1 | | 8/2009 | Iwatsuki et al. | |
| 2010/0023232 A1 | * | 1/2010 | Isaji et al. | 701/70 |
| 2010/0219011 A1 | * | 9/2010 | Shimoyama et al. | 180/218 |
| 2010/0292904 A1 | * | 11/2010 | Taguchi et al. | 701/93 |
| 2010/0305840 A1 | * | 12/2010 | Doi | 701/124 |

FOREIGN PATENT DOCUMENTS

| | | |
|---|---|---|
| JP | 05-149163 | 6/1993 |
| JP | 10-054264 | 2/1998 |
| JP | 2005-036750 A | 2/2005 |
| JP | 2005-219580 A | 8/2005 |
| JP | 2005-256636 A | 9/2005 |
| JP | 2006-506270 A | 2/2006 |
| JP | 2007-022431 A | 2/2007 |
| JP | 2007-297958 A | 11/2007 |
| JP | 2008-285066 A | 11/2008 |
| JP | 2009-202621 A | 9/2009 |
| JP | 2009-250766 A | 10/2009 |
| JP | 2010-006279 A | 1/2010 |
| JP | 2010-111300 | * 5/2010 |

* cited by examiner

*Primary Examiner* — James Trammell
*Assistant Examiner* — Demetra Smith-Stewart
(74) *Attorney, Agent, or Firm* — Sughrue Mion, PLLC

(57) ABSTRACT

A vehicle control system configured to stabilize a behavior of a vehicle during turning by correcting a driving force or a braking force. The vehicle control system comprises a lateral acceleration detecting means detecting longitudinal acceleration acting in an axle direction of the vehicle Ve (step S102); and a driving/braking force correcting means determining a changing amount Fctrl and a changing rate DFctrl of the correction based on the lateral acceleration Gy in case the running vehicle Ve is turned.

7 Claims, 19 Drawing Sheets

VEHICLE CONTROL SYSTEM

CROSS REFERENCE TO RELATED APPLICATIONS

This application is a National Stage of International Application No. PCT/JP2011/056550 filed on Mar. 18, 2011, which claims priority from Japanese Patent Application No. 2010-218727, filed on Sep. 29, 2010, the contents of all of which are incorporated herein by reference in their entirety.

TECHNICAL FIELD

The present invention relates to a control system for a vehicle, which is configured to control a driving force and a braking force of the vehicle for the purpose of stabilizing a turning behavior of the vehicle by improving steering characteristics.

BACKGROUND ART

Technologies for improving a turning performance of a vehicle by controlling a driving force and a braking force of the vehicle automatically in cooperation with a steering operation of a driver to stabilize steering characteristics have been developed in the prior art. For example, Japanese Patent Laid-Open No. 2005-256636 discloses an invention relating to a vehicle stability control system for stabilizing an attitude and characteristics of a vehicle by reducing a disturbance resulting from an operation of a driver and a road disturbance. Specifically, according to the teachings of Japanese Patent Laid-Open No. 2005-256636, a disturbance and a physical quantity resulting from a running resistance are estimated, and an axle torque is corrected based on the estimated disturbance and physical quantity so as to allow a stability factor to follow a target value.

Meanwhile, Japanese Patent Laid-Open No. 2009-202621 discloses an invention relating to a stabilizer system for vehicle, which is capable of changing a roll suppressing force generated by a stabilizer bar by actuating an actuator. Specifically, Japanese Patent Laid-Open No. 2009-202621 discloses a fact that cornering powers of front and rear wheels are changed by a longitudinal load movement when the vehicle is accelerated or decelerated during turning of the vehicle, and as a result, steering characteristics (i.e., a stability factor) of the vehicle is changed.

According to the invention disclosed by Japanese Patent Laid-Open No. 2005-256636, the vehicle stability control system is configured to correct and control the driving force of the vehicle in a manner to allow the stability factor of the vehicle to follow the target value when the running vehicle is turned, in other words, in a manner to allow the vehicle to turn under the target steering characteristics. Therefore, a turning performance of the vehicle can be improved by thus improving the steering characteristics during turning of the vehicle. However, the driving force may be varied in a manner to generate an unintentional longitudinal acceleration by thus being corrected. Consequently, shocks may be generated to provide uncomfortable feeling to the driver. In order to reduce such shocks and uncomfortable feeling, it is considerable to reduce a correction amount of the driving force. In this case, however, the turning performance may not be improved effectively.

DISCLOSURE OF THE INVENTION

The present invention has been conceived noting the technical problems thus far described, and its object is to provide a vehicle control system, which is capable of improving the turning performance of the vehicle as much as possible by controlling a driving force and a braking force, without causing shocks and without providing uncomfortable feeling to a driver.

In order to achieve the above-mentioned object, according to the present invention, there is provided a vehicle control system, which is configured to stabilize a behavior of a vehicle during turning by carrying out a correction to change a driving force or a braking force. The vehicle control system is characterized by comprising: a lateral acceleration detecting means, which is configured to detect a lateral acceleration acting in an axle direction of the vehicle; and a driving/braking force correcting means, which is configured to determine a changing amount and a changing rate of the correction based on the lateral acceleration in case of turning the vehicle.

The vehicle control system according to the present invention further comprises a lateral jerk detecting means, which is configured to detect a lateral jerk acting in an axle direction of the vehicle. According to the present invention, the above-mentioned driving/braking force correcting means includes a means configured to determine the changing amount and the changing rate based on the lateral jerk.

Moreover, according to the present invention, the driving/braking force correcting means includes a means configured to increase upper limit values of the changing amount and the changing rate in accordance with an increase in the lateral acceleration or the lateral jerk.

Further, according to the present invention, the driving/braking force correcting means includes a means configured to revise the changing amount and the changing rate to limit those values within a predetermined target region determined taking into consideration a control response to carry out the correction.

In addition, according to the present invention, the driving/braking force correcting means includes a means configured to revise the changing amount to reduce while revising the changing rate to increase.

The vehicle control system according to the present invention further comprises a differential threshold determining means, which is configured to determine a differential threshold to judge whether or not the driver feels an uncomfortable feeling when carrying out the correction, by approximating the differential threshold to a predetermined continuous curve on a coordinate system composed of coordinate axes representing the changing amount and the changing rate. In addition, the driving/braking force correcting means includes a means configured to determine the changing amount and the changing rate in a manner to limit those values within the region where the driver does not feel an uncomfortable feeling by the differential threshold.

Specifically, the above-mentioned curve includes a hyperbolic curve extending along a linear asymptotic line representing the predetermined changing amount and a linear asymptotic line representing the predetermined changing rate.

According to the present invention, the differential threshold determining means includes a means configured to calculate the predetermined changing amount and the predetermined changing rate of the asymptotic lines based on the lateral acceleration and/or lateral jerk.

Thus, according to the present invention, the vehicle control system is configured to stabilize the turning behavior of the vehicle by correcting the driving force or the braking force. For this purpose, the vehicle control system detects the lateral acceleration of the vehicle on the occasion of carrying out the control for stabilizing the turning behavior of the vehicle, and determines the changing amount and the changing rate to correct the driving force or the braking force based on the detected lateral acceleration. Therefore, the longitudinal acceleration of the vehicle will not be fluctuated significantly and unintentionally by such correction of the driving force or the braking force during turning of the vehicle. For this reason, an uncomfortable feeling of the driver and the shocks resulting from the fluctuation in the longitudinal acceleration can be reduced. That is, the driving force or the braking force can be corrected in the maximum amount and at an appropriate rate within the range where the driver does not feel an uncomfortable feeling and the shocks will not be generated. Therefore, a turning performance of the vehicle can be improved by thus stabilizing the turning behavior thereof without providing an uncomfortable feeling to the driver and without causing shocks.

The vehicle control system according to the present invention is also configured to detect the lateral jerk of the vehicle, and to determine the changing amount and the changing rate to correct the driving force or the braking force based on the detected lateral jerk, on the occasion of carrying out the control for stabilizing the turning behavior of the vehicle. In case of thus determining the changing amount and the changing rate to correct the driving force or the braking force based on the detected lateral jerk as a derivative of the lateral acceleration with respect to time, an accuracy and a sensitivity of the control for stabilizing the turning behavior of the vehicle can be improved in comparison with the case of using the lateral acceleration.

Specifically, according to the present invention, the changing amount of the driving force or the braking force is determined according to the magnitude of lateral acceleration or lateral jerk, and the changing rate of the driving force or the braking force is determined according to the changing amount thus determined. That is, the upper limit values of the changing amount and the changing rate are set to larger values according to an increase in the lateral acceleration or the lateral jerk thereby increasing the changing amount and the changing rate. Therefore, the driving force or the braking force can be corrected in the maximum changing amount and at the maximum changing rate within the range where the driver does not feel an uncomfortable feeling and where the shocks will not be caused, in accordance with the magnitude of the lateral acceleration or the lateral jerk acting on the vehicle. Thus, the turning behavior of the vehicle can be stabilized without providing an uncomfortable feeling to the driver and without causing shocks.

In addition, according to the present invention, the changing amount and the changing rate to correct the driving force or the braking force are revised taking into consideration the control response of the correction. For example, the changing amount and the changing rate to correct the driving force or the braking force are further revised taking into consideration the control response such as a delay and a dead time of the correction. Therefore, deterioration in an improvement of the turning performance resulting from the inevitable control delay can be prevented without providing an uncomfortable feeling with the driver and without causing shocks. Thus, the turning performance of the vehicle can be improved by stabilizing the turning behavior while preventing the uncomfortable feeling and the shocks.

In case of thus revising the changing amount and the changing rate to correct the driving force or the braking force taking into consideration the control response, specifically, the changing amount is revised to be reduced and the changing rate is revised to be increased. As a result, a substantive changing amount is reduced, however, the changing rate is increased. Therefore, the turning performance of the vehicle can be stabilized from the beginning of the correction so that the turning performance of the vehicle can be improved.

In addition, according to the present invention, the differential threshold is determined to judge whether or not the driver feels an uncomfortable feeling when correcting the driving force or the braking force. Specifically, such differential threshold is determined while being approximated by a predetermined continuous curve on a coordinate system composed of coordinate axes representing the changing amount and the changing rate. Therefore, an impact on the driver resulting from carrying out the correction of the driving force or the braking force can be judged accurately using the threshold thus determined continuously, so that the control for stabilizing the vehicle behavior can be carried out appropriately. The differential threshold may also be calculated using an operational expression expressing a predetermined curve. Therefore, it is unnecessary to prepare a control map in advance by collecting lots of data so that man-hour for carrying out experimentation for preparing the control map can be eliminated. In addition, since the control map is thus not used, it is unnecessary to store large quantity of data relating to the control map into a memory of the control unit. Therefore, a load on the memory of the electronic control unit can be lightened significantly.

According to the present invention, specifically, the differential threshold is approximated by the hyperbolic curve extending along linear asymptotic lines representing the predetermined changing amount and the predetermined changing rate for correction. Therefore, the differential threshold can be set accurately by thus approximating.

In addition, according to the present invention, the operational expression expressing the hyperbolic curve by which the differential threshold is approximated is set on the basis of the lateral acceleration or the lateral jerk of the vehicle, and the differential threshold can be calculated using the operational expression expressing the hyperbolic curve. Therefore, the differential threshold can be determined accurately and promptly so that the control for stabilizing the vehicle behavior can be carried out properly.

BEST MODE FOR CARRYING OUT THE INVENTION

Figure 1:
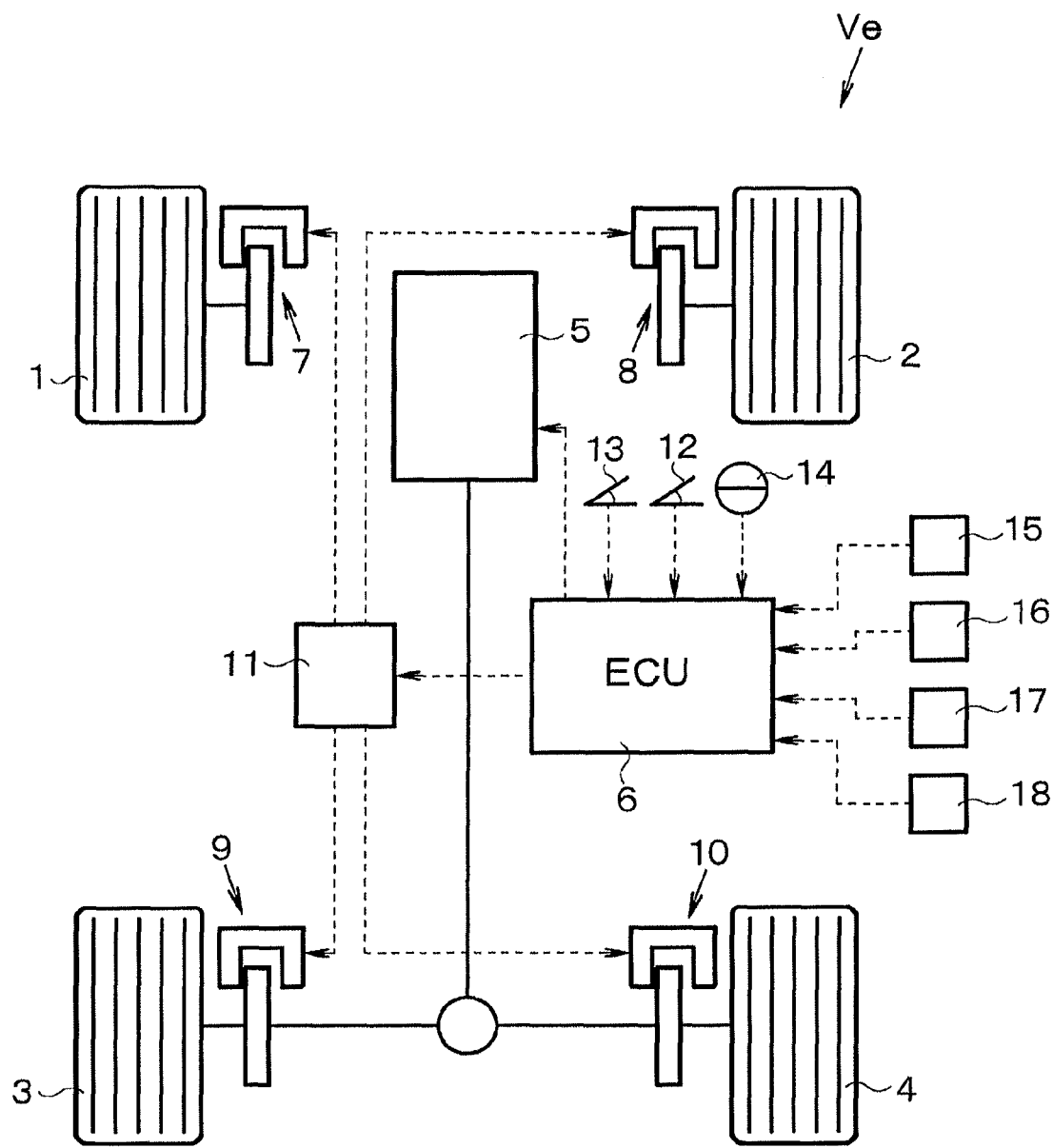
FIG. 1 is a view schematically showing an example of a structure and a control system of the vehicle to which the control system according to the present invention is applied.

Next, an example of the present invention will be explained with reference to accompanying drawings. First of all, a structure of the vehicle to which the present invention is applied and a control system thereof will be explained with reference to FIG. 1. The vehicle to which the present invention is applied is configured to control driving force and the braking force automatically independent from an accelerating operation and a braking operation of the driver, that is, independent from the drive force control and the braking force control based on the operations carried out by the driver. As shown in FIG. 1, a vehicle Ve is provided with a left front wheel 1, a right front wheel 2, a left rear wheel 3, and a right rear wheel 4. The rear wheels 3 and 4 are driven by a prime mover 5. Thus, the vehicle Ve is a rear drive vehicle.

For example, at least one of an internal combustion engine and an electric motor can be used as the prime mover 5. Alternatively, both internal combustion engine and electric motor can be used as the prime mover 5 to form a hybrid vehicle. Specifically, the internal engine includes a gasoline engine, a diesel engine, an LP gas engine and so on. In case of using the internal combustion engine to serve as the prime mover 5 of the vehicle Ve, a transmission (not shown) such as a manual transmission and an automatic transmission is arranged on an output side of the prime mover 5. Instead, in case of using the electric motor to serve as the prime mover 5 of the vehicle Ve, an electric storage device such as a battery and a capacitor (both not shown) is connected with the electric motor through an inverter.

In order to control a driving condition of the rear wheels 3 and 4 by controlling an output of the prime mover 5, the vehicle Ve is provided with an electronic control unit (abbreviated as ECU) 6. Specifically, the electronic control unit 6 is connected with the prime mover 5, therefore, the driving force of the vehicle Ve generated by the rear wheels 3 and 4 functioning as driving wheels can be controlled automatically by controlling the output of the prime mover 5 by the electronic control unit 6.

Those wheels 1, 2, 3 and 4 are individually provided with braking devices 7, 8, 9 and 10, and those braking devices 7 to 10 are also connected with the electronic control unit 6 through an actuator 11. Therefore, the braking force of the vehicle Ve generated by each of the wheel 1 to 4 can be controlled automatically by controlling operating state of the braking devices 7 to 10.

Detection signals from sensors of the vehicle Ve and information signals from vehicle equipment are inputted to the electronic control unit 6. For example, detection signals from: an accelerator sensor 12 for detecting a depression angle (i.e., depression amount or opening degree) of an accelerator; a brake sensor 13 for detecting a depression angle (i.e., depression amount or opening degree) of the braking device; a steering angle sensor 14 for detecting a steering angle of a steering wheel; a wheel speed sensor 15 for detecting a rotational speed of the wheels 1 to 4; a longitudinal acceleration sensor 16 for detecting longitudinal acceleration of the vehicle Ve (i.e., vertical direction in FIG. 1); a lateral acceleration sensor 17 for detecting lateral acceleration of the vehicle Ve (i.e., horizontal direction in FIG. 1); a yaw rate sensor 18 for detecting a yaw rate of the vehicle Ve; a torque sensor (not shown) for detecting an output torque of the prime mover 5 and so on are inputted to the electronic control unit 6.

Thus, the vehicle Ve is configured to control the steering characteristics and the stability factor. Specifically, the vehicle Ve is configured to improve the turning performance thereof by improving the steering characteristics during turning. For this purpose, a target steering characteristics of the vehicle Ve is determined on the basis of a vehicle speed and a road friction coefficient estimated from the speeds of the wheels 1 to 4 detected by the wheel speed sensor 15, and a steering angle detected by the steering angle sensor 14. Therefore, actual steering characteristics of the vehicle Ve can be controlled to achieve the target steering characteristics.

Specifically, the actual steering characteristics of the vehicle Ve can be approximated to the target steering characteristics by controlling the yaw rate of the vehicle Ve by changing the driving force and the braking force of the vehicle Ve, that is, by carrying out a so-called "driving/braking force control". In order to control the yaw rate of the vehicle Ve, a current target yaw rate of the vehicle Ve is determined based on the vehicle speed, the steering angle, a wheel base etc., and the driving force and the braking force of the vehicle Ve are controlled in a manner to approximate the actual yaw rate of the vehicle Ve to the target yaw rate. For example, the yaw rate of the vehicle Ve can be controlled by changing a driving torque being applied to the drive wheels 2 and 3 in a correction amount, or by changing a braking torque being applied to the braking devices 1 to 4 in a correction amount. However, such control to approximate the actual yaw rate to the target yaw rate set in advance has already disclosed in Japanese Patent Laid-Open No. 5-278488 etc. Therefore, detailed explanation about such known control will be omitted.

In case of thus controlling the steering characteristics of the vehicle Ve during turning, the steering characteristics of the vehicle Ve can be improved by carrying out the aforementioned "driving/braking force control" during turning thereby approximating the steering characteristics of the vehicle Ve to the target steering characteristics. That is, a response of the actual steering characteristics of the vehicle Ve to the control is quickened by increasing a correction amount of the "driving/braking force control", that is, by increasing a changing amount of the driving force or the braking force. As a result, the turning performance of the vehicle Ve can be improved. However, if the correction amount of the driving force or the braking force is increased, the driving force or the braking force is varied significantly during turning of the vehicle Ve thereby causing shocks and providing uncomfortable feeling with the driver. As a result, drivability of the vehicle Ve is degraded.

Therefore, according to the present invention, the vehicle control system is configured to improve the turning performance of the vehicle as much as possible without causing shocks and without providing uncomfortable feeling to the driver, by carrying out the "driving/braking force control" taking into consideration the lateral acceleration of the vehicle Ve and a jerk as a derivative of the acceleration.

Figure 2:
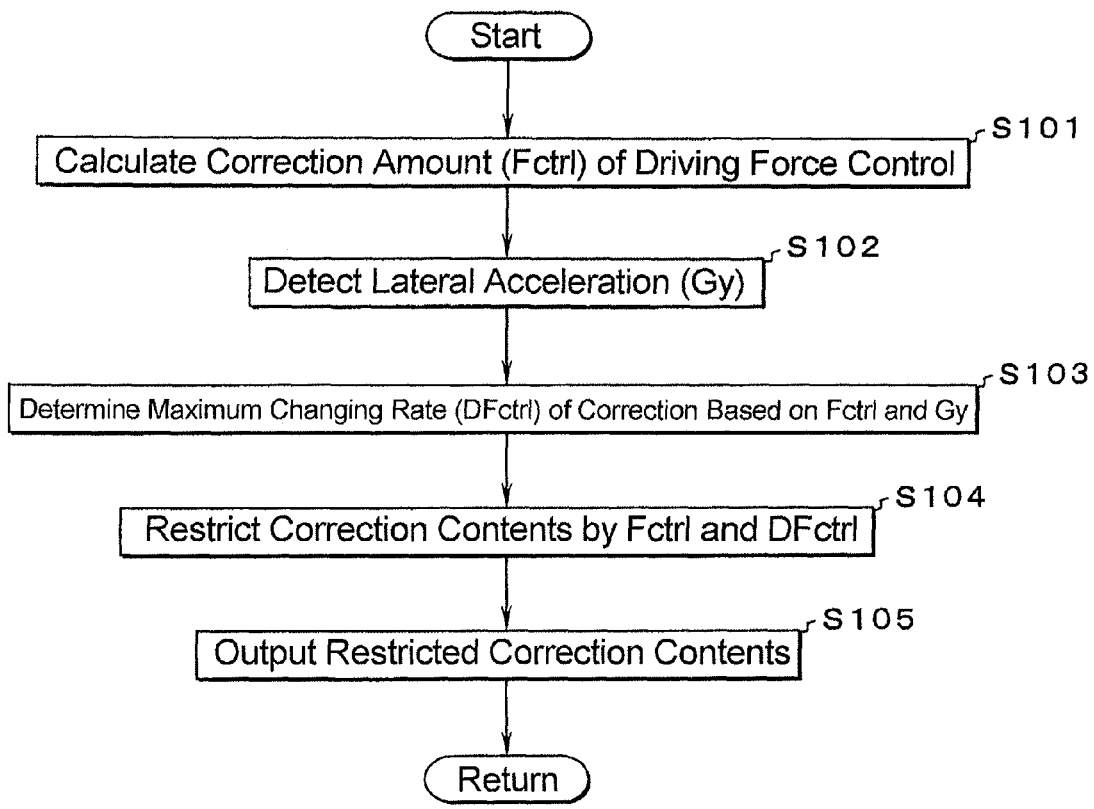
FIG. 2 is a flowchart explaining an example of carrying out the driving force control of the vehicle control system according to the present invention based on the lateral acceleration of the vehicle.

FIG. 2 is a flowchart explaining one example of the above-mentioned control, and the routine shown therein is executed repeatedly in a predetermined short cycle. According to the control shown in FIG. 2, first of all, an actual turning condition of the vehicle Ve is estimated from the detection values of the steering angle, yaw rate and etc., and a changing amount (or correction amount) Fctrl of the driving force or the braking force to be corrected under the driving/braking force control is calculated based on a deviation between the estimated actual turning condition and a target turning condition of the vehicle Ve (at step S101). Specifically, the turning condition of the vehicle Ve is a factor obtained based on the detection values of speed, steering angle, yaw rate and so on of the vehicle Ve, that is, a stability factor representing a degree of an oversteer and an understeer.

Then, lateral acceleration Gy in the axle direction of the vehicle Ve is detected (at step S102). As described, the lateral acceleration Gy can be detected based on the detection value of the lateral acceleration sensor 17.

Thereafter, a maximum changing rate DFctrl, which is an upper limit value of a speed of change to correct the driving force or braking force, is determined based on the changing amount Fctrl calculated at step S101 and the lateral acceleration Gy detected at step S102 (at step S103). In order to determine the maximum changing rate DFctrl, for example, a range of rate of change to correct the driving force or the braking force in which the driver feels uncomfortable feeling, and a range of amount of change to correct the driving force or the braking force in which the driver feels uncomfortable feeling are detected based on an experimentation, under various lateral acceleration Gy of the vehicle Ve. The range of rate of change and the range of amount of change thus detected are used to prepare a control map or an operational expression in advance. Therefore, the maximum changing rate DFctrl is determined with reference to the control map or using the operational expression corresponding to the lateral acceleration Gy detected at step S102.

Figure 3:
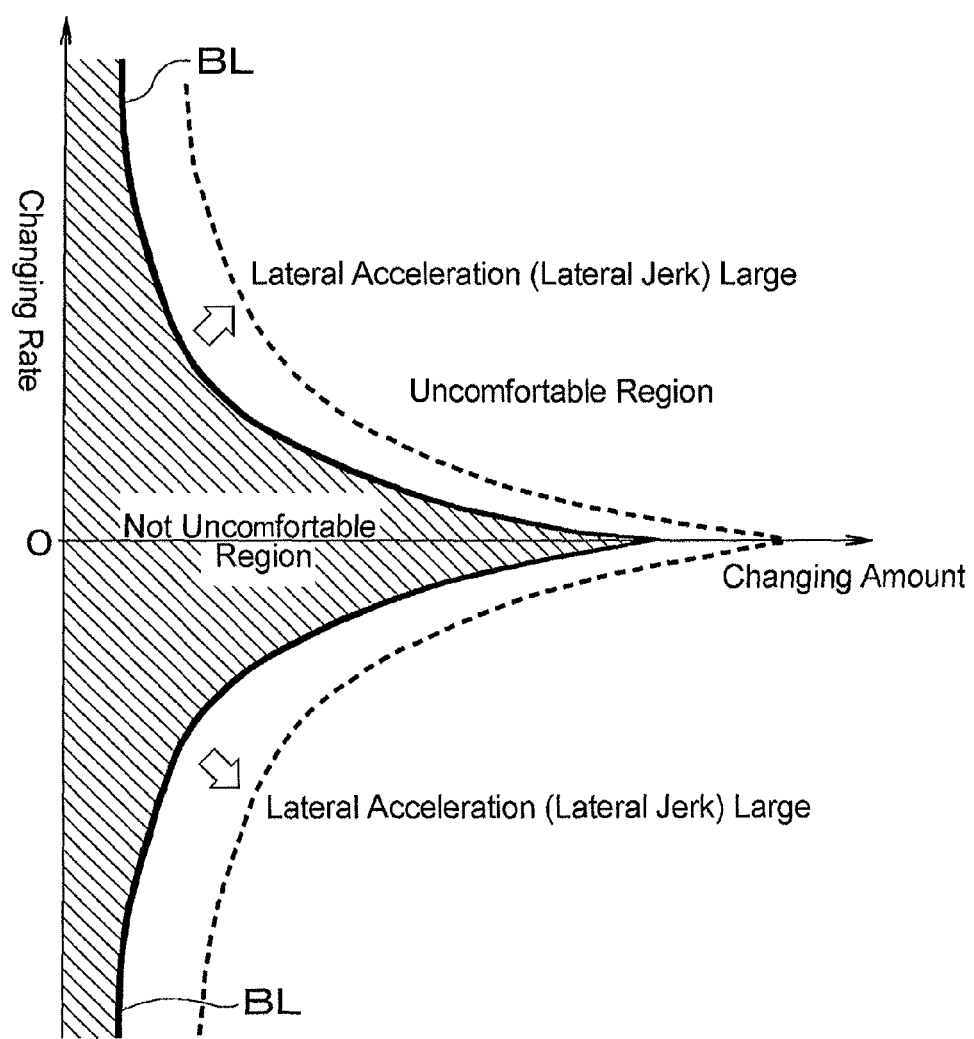
FIG. 3 is a view schematically showing an example of a control map used to obtain the changing amount and the changing rate of driving force or braking force that do not provide an uncomfortable feeling to the driver when carrying out the control shown in FIG. 2.
Figure 4:
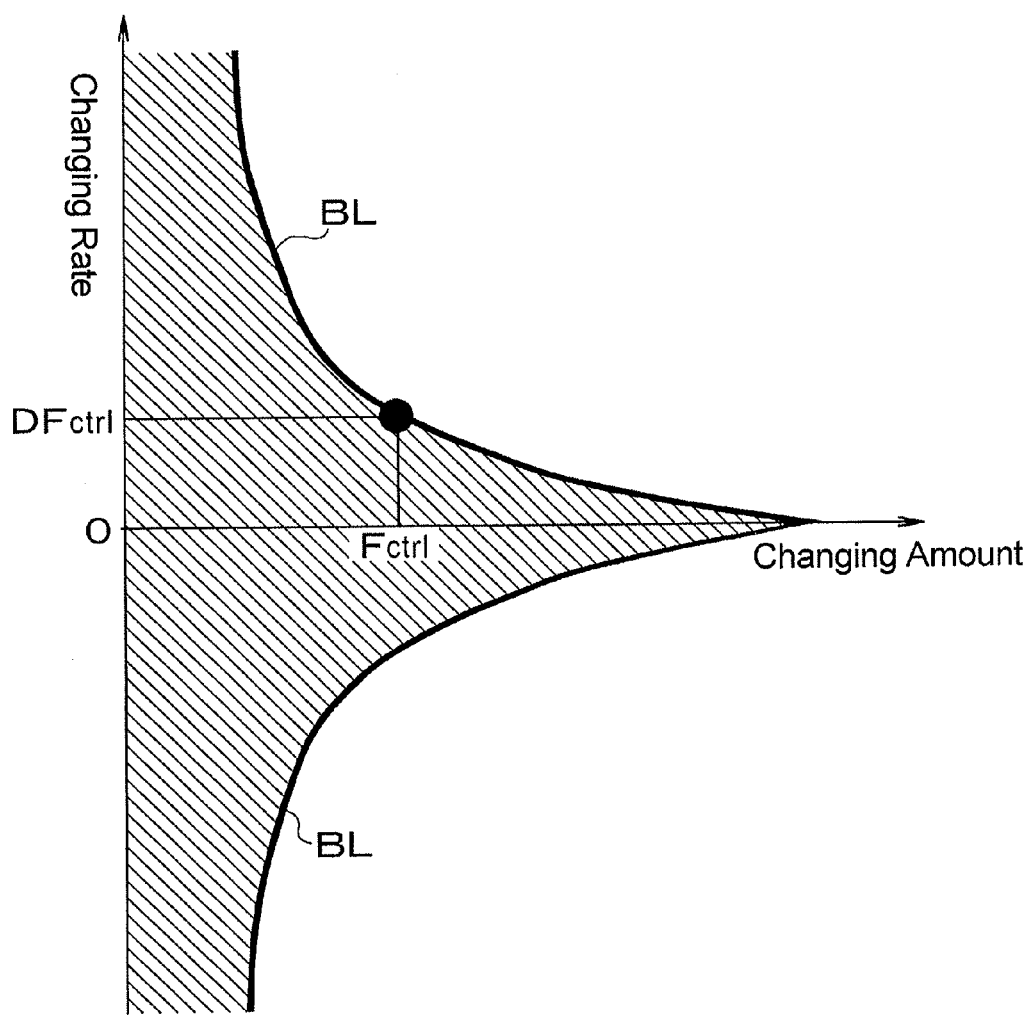
FIG. 4 is a view schematically explaining how to obtain the changing amount and the changing rate of the driving force or the braking force with reference to the map shown in FIG. 3.

An example of the control map to determine the maximum changing rate DFctrl is shown in FIGS. 3 and 4. In FIGS. 3 and 4, a curved line BL is a boundary line between a "not uncomfortable region" where the driver does not feel an uncomfortable feeling (i.e., a shadowed region in FIGS. 3 and 4) and an "uncomfortable region" where the driver feels an uncomfortable feeling (i.e., an unshadowed region in FIGS. 3 and 4), under the situation in which the driving force or the braking force is corrected in a predetermined amount of change and at a predetermined rate of change. As shown in FIG. 3, the curved line BL, that is, the boundary line BL is displaced toward right side in FIG. 3 in accordance with an increase in the lateral acceleration Gy. That is, the "not uncomfortable region" is a criterion to judge whether or not the driver feels an uncomfortable feeling, and the "not uncomfortable region" is expanded in accordance with an increase in the lateral acceleration Gy of the vehicle Ve. In other words, an upper limit value of the changing amount Fctrl and an upper limit value of the rate of change (that is, the maximum changing rate) DFctrl to correct the driving force or the braking force are increased in accordance with an increase in the lateral acceleration Gy of the vehicle Ve.

Specifically, in case of determining the maximum changing rate DFctrl with reference to the above-explained control map, the control map shown in FIG. 4 corresponding to the lateral acceleration Gy detected at step S102 is selected. Then, the upper limit of a rapidity of change in the driving force or the braking force within the region where the driver does not feel an uncomfortable feeling, that is, the maximum changing rate of change DFctrl is determined based on the changing amount Fctrl calculated at step S101. In case the changing amount Fctrl of the driving force or the braking force calculated at step S101 is out of the "not uncomfortable region", the changing amount Fctrl is reduced to be limited within the "not uncomfortable region", and then, the maximum changing rate DFctrl is determined based on the changing amount Fctrl thus reduced.

After thus determining the maximum changing rate DFctrl to correct the driving force or the braking force at step S103, contents of the correction of the driving force or the braking force to be carried out are restricted (at step S104). That is, the amount to correct the driving force or the braking force is restricted to the changing amount Fctrl, and the rate to correct the driving force or the braking force to be corrected is restricted to the maximum changing rate DFctrl. Specifically, as indicated in a time chart shown FIG. 5, a rate of changing the driving force or the braking force is restricted within the maximum changing rate DFctrl represented by an angle α, and an amount to change the driving force or the braking force is restricted to the changing amount Fctrl.

Figure 5:
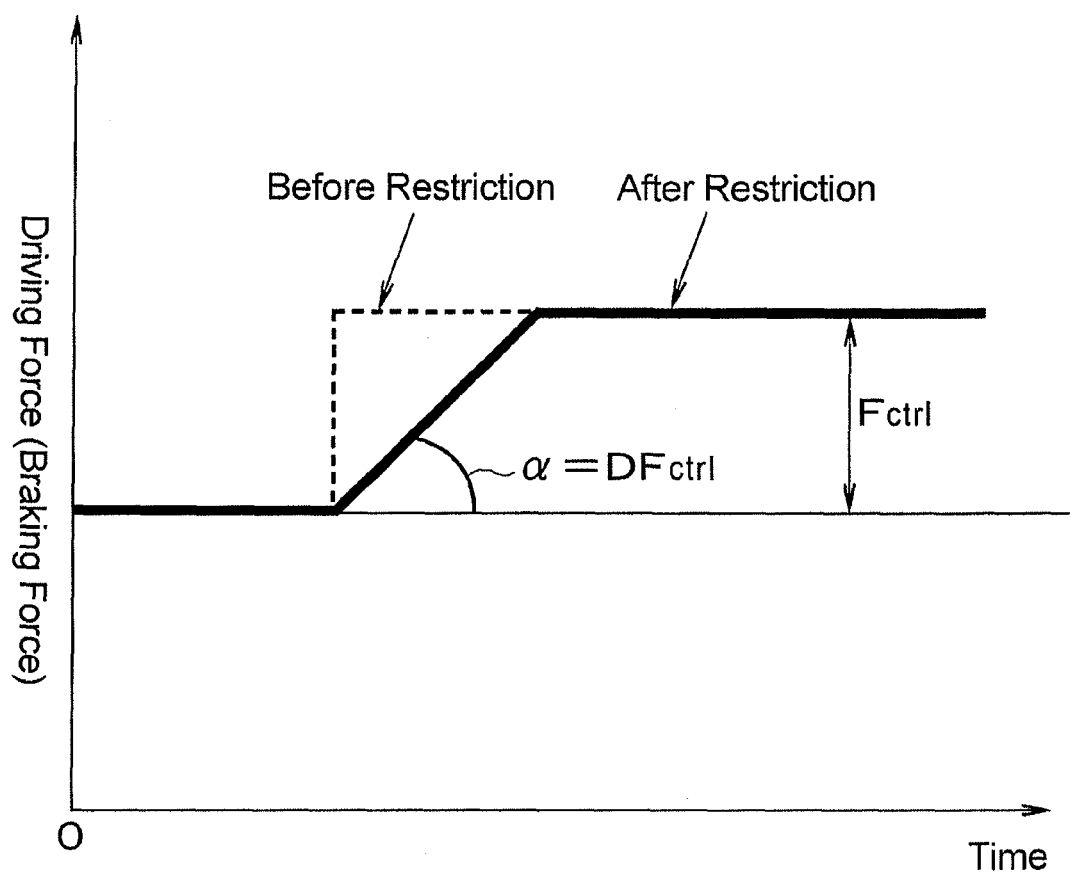
FIG. 5 is a graph schematically showing a difference between the case in which the correction values of the driving force or the braking force are restricted, and the case in which the correction values of the driving force or the braking force are not restricted.

In FIG. 5, a broken line represents a change in the driving force or the braking force of the case in which the rate of change is not restricted by the maximum changing rate DFctrl. In this case, the rate to change the driving force or the braking force is not restricted, therefore, the driving force or the braking force is changed rapidly in the changing amount Fctrl. However, if the driving force or the braking force is thus changed rapidly in the changing amount Fctrl as shown in FIG. 5, the driving force or the braking force of the vehicle Ve is changed drastically thereby causing shocks and providing the driver with an uncomfortable feeling. In order to avoid such disadvantages, according to the present invention, the maximum value of the rate of change to correct the driving force or the braking force is restricted. Therefore, as shown in FIG. 5, the driving force or the braking force of the vehicle Ve is increased gradually at the angle α so that the shocks can be reduced. For this reason, the driver will not feel an uncomfortable feeling.

After thus restricting the correction contents of the driving force or the braking force at step S104, the correction contents thus restricted (to the changing amount Fctrl and the maximum changing rate DFctrl) are outputted. That is, the driving/braking force control is carried out based on the correction contents thus restricted (at step S105). Then, the routine is returned.

Thus, according to the control example explained with reference to the flowchart shown in FIG. 2, the lateral acceleration Gy (in the axle direction or width direction) is detected during turning of the vehicle Ve, and the driving force or the braking force is corrected based on the detected lateral acceleration Gy. In addition, according to the present invention, the vehicle control system is also configured to carry out the driving/braking force control based on a detected lateral jerk of the vehicle Ve.

Specifically, jerk is a derivative of acceleration with respect to time. As to impact of jerk and acceleration, basically, the driver is more sensitive to jerk in comparison with acceleration. Therefore, accuracy of the driving/braking force control of the present invention can be enhanced taking into consideration the lateral jerk of the vehicle Ve, in addition to the lateral acceleration Gy.

Figure 6:
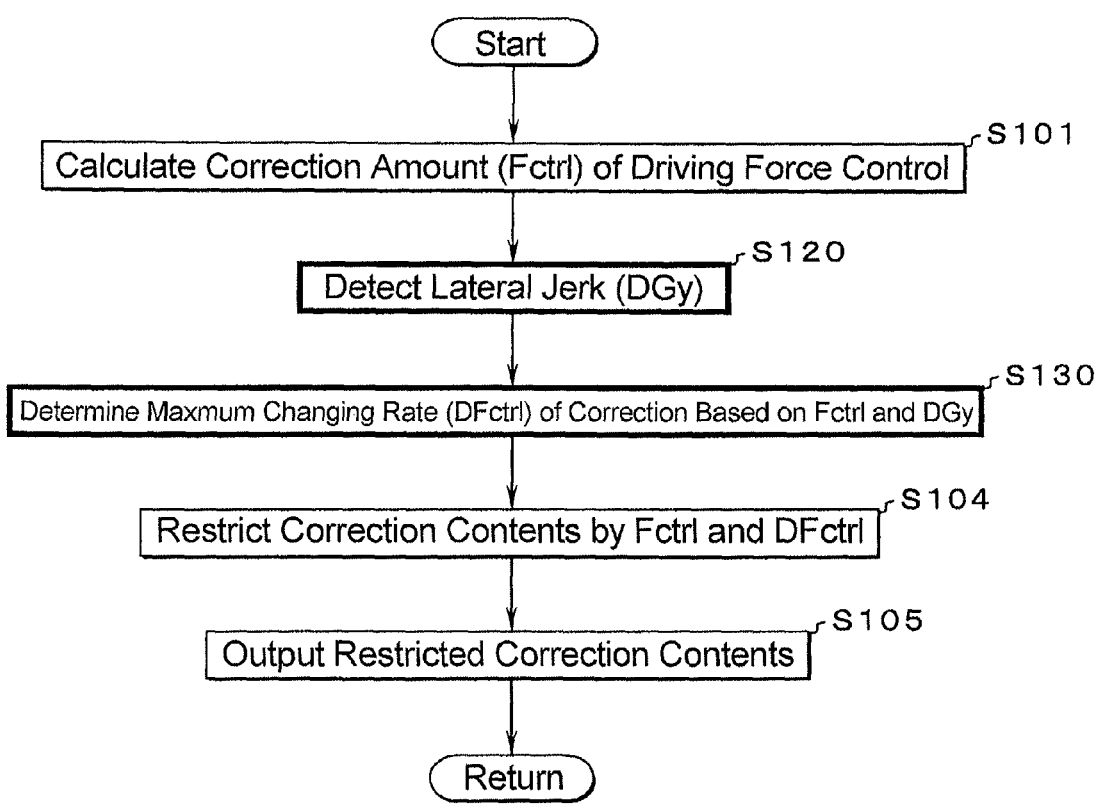
FIG. 6 is a flowchart explaining an example of carrying out the driving force control shown in FIG. 2 based on the lateral jerk of the vehicle.

In this case, as shown in FIG. 6, the driving/braking force control of the present invention is carried out based on a lateral jerk DGy of the vehicle Ve, instead of the lateral acceleration Gy used in the above-explained example. In the flowchart shown in FIG. 6, steps S120 and S130 correspond individually to steps S102 and S103 of the control example shown in FIG. 2. Specifically, the lateral jerk DGy in the axle direction of the vehicle Ve is detected (at step S120). As described, the lateral jerk DGy is a derivative of the lateral acceleration Gy with respect to time. Therefore, for example, the lateral jerk DGy can be calculated based on the detection value of the lateral acceleration sensor 17.

Then, the maximum changing rate DFctrl is determined (at step S130). As described, the maximum changing rate DFctrl is an upper limit value of a rapidity of change to correct the driving force or braking force, and in this example, the maximum changing rate DFctrl is determined based on the changing amount Fctrl of the driving force or the braking force calculated at step S101, and the lateral jerk DGy of the vehicle Ve detected at step S120.

As the above-explained case of using the lateral acceleration Gy, in the map shown in FIGS. 3 and 4, the maximum changing rate DFctrl at which the driver does not feel uncomfortable feeling when correcting the driving force or the braking force is increased in accordance with an increase in the lateral jerk DGy of the vehicle Ve. Accordingly, steps S120 and S130 can be carried out by the procedure to carry out steps S102 and S103 shown in FIG. 2 while using the lateral jerk DGy instead of the lateral acceleration Gy. In this example, control contents of the remaining steps are identical to those of the flowchart shown in FIG. 2.

Figure 7:
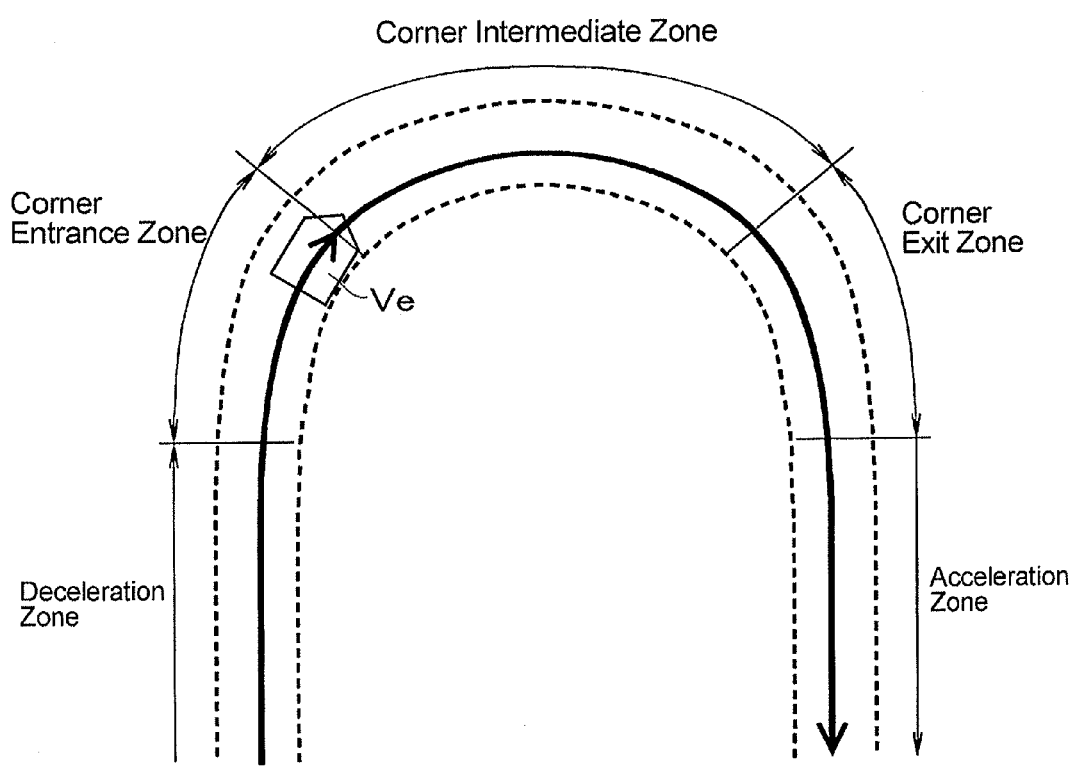
FIG. 7 is a view explaining a difference between an effect of the lateral acceleration and an effect of the lateral jerk in case of carrying out the controls shown in FIGS. 2 and 5.

Thus, the vehicle control system according to the present invention is allowed to carry out the driving/braking force control more properly taking into consideration both of the lateral acceleration Gy and the lateral jerk DGy of the vehicle Ve. For example, in case a course of the vehicle Ve is curved as shown in FIG. 7, the vehicle Ve runs through a straight deceleration zone, an entrance zone of a corner, an intermediate zone of the corner, an exit zone of the corner, and a straight acceleration zone. In this case, the lateral acceleration Gy becomes relatively smaller and the lateral jerk DGy becomes relatively larger when the vehicle Ve is running through the entrance zone and the exit zone of the corner. To the contrary, the lateral acceleration Gy becomes relatively larger and the lateral jerk DGy becomes relatively smaller when the vehicle Ve is running through the intermediate zone of the corner.

Therefore, in case of carrying out the driving/braking force control during turning of the vehicle Ve, the driving force or the braking force is corrected based on the lateral jerk DGy in the entrance zone and the exit zone of the corner where the lateral jerk DGy is relatively larger, and the driving force or the braking force is corrected based on the lateral acceleration Gy in the intermediate zone of the corner where the lateral acceleration Gy is relatively larger. For this reason, the vehicle control system according to the present invention is allowed to carry out the driving/braking force control more appropriately.

Figure 8:
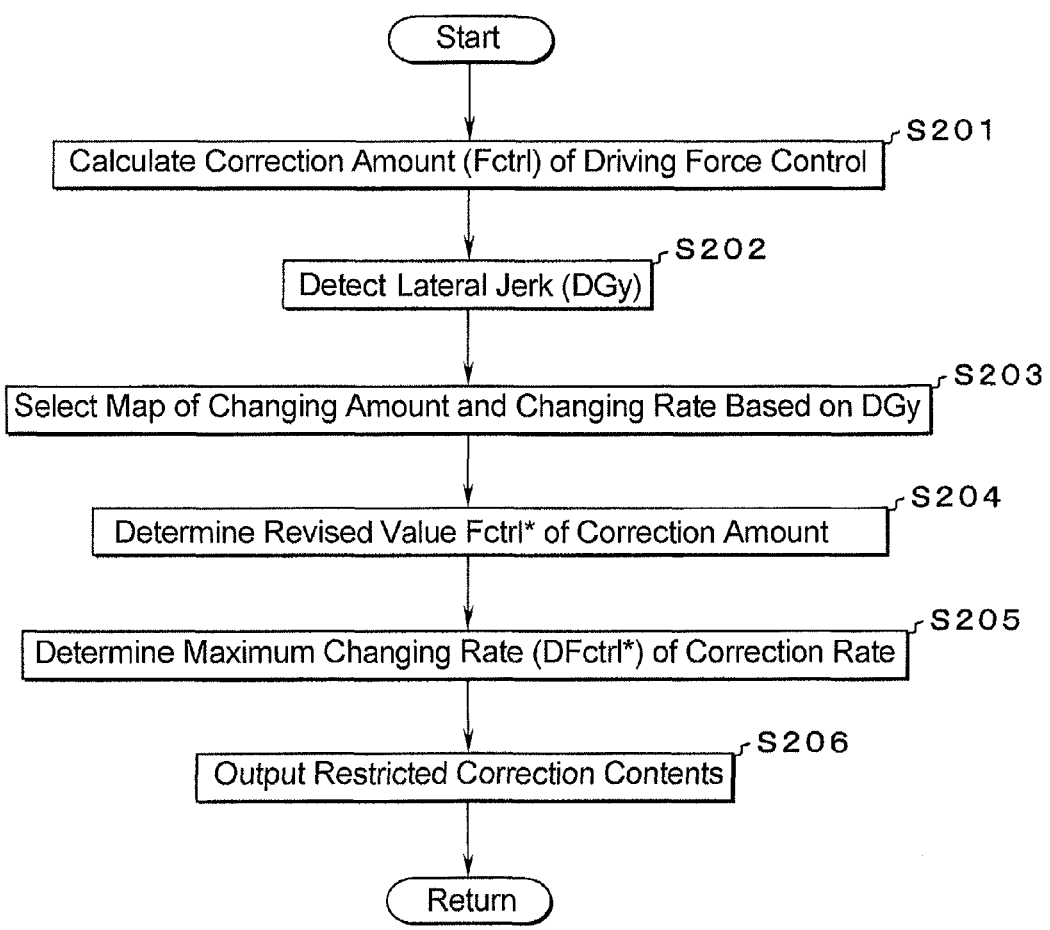
FIG. 8 is a flowchart explaining another example of the driving force control carried out by the vehicle control system of the present invention based on the lateral jerk of the vehicle.

In addition to the control examples explained with reference to the flowcharts shown in FIGS. 2 and 6, the vehicle control system according to the present invention is configured to carry out the driving/braking force control also taking into consideration a control response. Specifically, according to the present invention, the driving/braking force control can be carried out taking into consideration a lag time until achieving the correction (i.e., changing) amount of the driving force or the braking force determined to carry out the driving/braking force control. FIG. 8 is a flowchart for explaining another example to carry out the control taking into consideration the control response, and the routine shown therein is executed repeatedly in a predetermined short cycle. According to the control shown in FIG. 8, first of all, an actual turning condition of the vehicle Ve is estimated based on the detection values of the steering angle, yaw rate, and etc., and a changing amount (or correction amount) Fctrl of the driving force or the braking force to be corrected under the driving/braking force control is calculated based on a deviation between the estimated actual turning condition and a target turning condition of the vehicle Ve (at step S201). Then, the lateral jerk DGy in the axle direction of the vehicle Ve is detected (at step S202). Thus, contents of those steps S201 and S202 are similar to those of steps S102 in FIG. 2 and S120 in FIG. 6.

Figure 9:
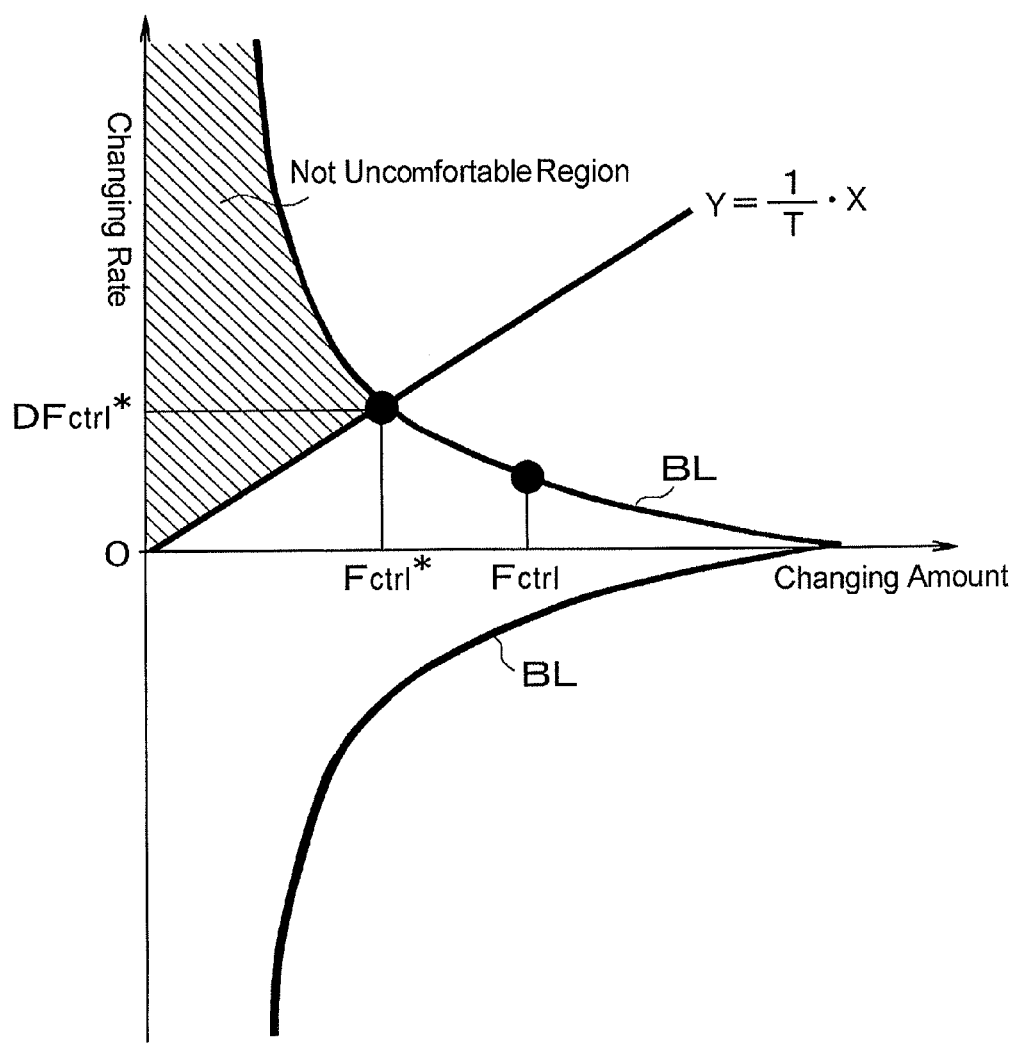
FIG. 9 is a view schematically showing an example of a control map used to obtain the changing amount and the changing rate of driving force or braking force that do not provide an uncomfortable feeling to the driver in case of carrying out the control shown in FIG. 8.

After detecting the lateral jerk DGy of the vehicle Ve, a control map relating to the changing amount and the changing rate to correct the driving force or the braking force is selected based on the detected lateral jerk DGy (at step S203). For this purpose, the control maps shown in FIG. 9 are prepared in advance for various lateral jerk DGy of the vehicle Ve. In the map shown in FIG. 9, specifically, ranges of the changing amount and the changing rate to correct the driving force or the braking force in which the driver feels uncomfortable feeling are stipulated based on experimentation. Therefore, at step S203, the control map corresponding to the lateral jerk DGy detected at step S202 is selected from the control maps thus prepared. As the map shown in FIGS. 3 and 4, a relation between the rate and amount to correct the driving force or the braking force is also determined in the control map shown in FIG. 9. However, in the control map shown in FIG. 9, the "not uncomfortable region" where the driver does not feel an uncomfortable feeling is stipulated taking into consideration the control response. Specifically, as can be seen from the control map shown in FIG. 9, the "not uncomfortable region" is defined by the boundary line BL dividing the "not uncomfortable region" and the "comfortable region" in the map shown in FIGS. 3 and 4, and an after mentioned straight line "$Y=(1/T)\cdot X$".

Then, a revised value Fctrl* of the changing amount Fctrl to correct the driving force or the braking force is determined with reference to the control map thus selected (at step S204). That is, the revised value Fctrl* thus determined is a maximum correction amount of the driving force or the braking force. Specifically, according to this example, the revised value Fctrl* is determined by revising the changing amount Fctrl in a manner to limit the changing amount within the target region, i.e., within the "not uncomfortable region" shown in FIG. 9 stipulated taking into consideration the control response.

As described, the line "$Y=(1/T)\cdot X$" is drawn in the control map shown in FIG. 9, where X represents the amount of change and Y represents the rate of change to correct the driving force or the braking force. Therefore, according to this control example, the "not uncomfortable region" (i.e., the shadowed region in FIG. 9) is restricted to fall inside (i.e., a small amount side) of the boundary line BL and an upper side (i.e., a high speed side) of the line "$Y=(1/T)\cdot X$", which can be expressed as:

$$Y \geq (1/T)\cdot X.$$

Accordingly, the maximum changing amount Fctrl in the "not uncomfortable region" thus restricted in FIG. 9 is determined as the revised value Fctrl*. Here, T in the above relational expressions represents a permissible time to correct the driving force or the braking force in the changing amount Fctrl. That is, the permissible time T the longest length of time to correct the driving force or the braking force without providing an uncomfortable feeling with the driver, and the permissible time T can be determined based on experimentation.

Then, a maximum changing rate DFctrl* to correct the driving force or the braking force is determined based on the revised value Fctrl* of the changing amount Fctrl and the selected control map (at step S205). That is, the maximum changing rate DFctrl* is an upper limit value of the rapidity to correct the driving force or the braking force in the amount of the revised value Fctrl* of the changing amount Fctrl. Specifically, the maximum changing rate DFctrl* is determined based on the revised value Fctrl* in the "not uncomfortable region" of the control map shown in FIG. 9.

Thus, the driving force or the braking force can be corrected taking into consideration the control response by thus determining the revised value Fctrl* of the changing amount Fctrl and the maximum changing rate DFctrl* with reference to the control map shown in FIG. 9. According to the above-explained control examples shown in FIGS. 2 and 6, the changing amount and the changing rate to correct the driving force or the braking force are restricted to the largest changing amount and the fastest changing rate within the range where the driver does not feel uncomfortable feeling. Nonetheless, such correction of the driving force or the braking force is delayed inevitably to achieve the preset correction amount. Therefore, the required length of time to complete the correction has to be extended in the amount of such a lag time, and the improvement of the turning performance is thereby degraded. However, by thus correcting the driving force or the braking force while taking into consideration such inevitable control delay, the turning performance can be improved as much as possible without providing an uncomfortable feeling to the driver.

After the revised value Fctrl* of the changing amount Fctrl and the maximum changing rate DFctrl* are thus determined, the correction contents of the driving/braking force control to be carried out are restricted and outputted (at step S206). That is, the amount to correct the driving force or the braking force is restricted to the revised value Fctrl* and the rate to correct the driving force or the braking force is restricted to the maximum changing rate DFctrl*, and the driving/braking force control is carried out based on the correction contents thus restricted. Then the routine is returned.

Figure 10:
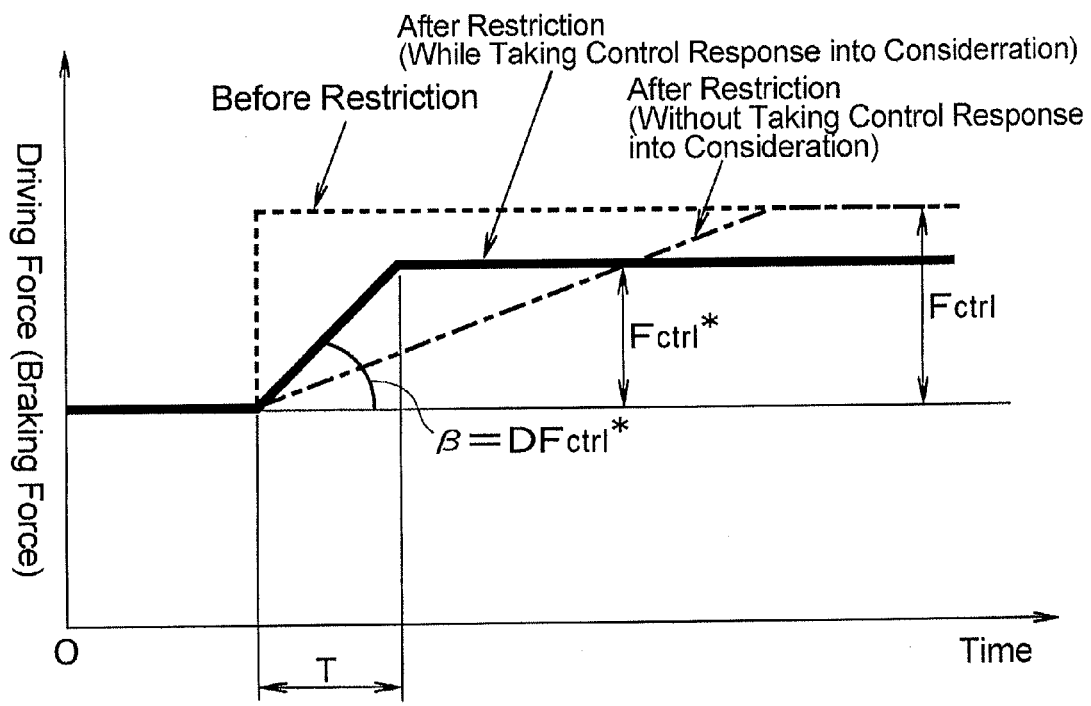
FIG. 10 is a graph schematically showing a difference between the cases in which the correction values of the driving force or the braking force are restricted and not restricted, and a difference between the cases in which control delay is taken into consideration and not taken into consideration.

FIG. 10 is a time chart showing a change in the actual driving (or braking) force in case the driving/braking force control is carried out while taking into consideration the control delay. According to this example of the driving/braking force control, as shown in FIG. 10, the rate of change to correct the driving force or the braking force is restricted within the maximum changing rate DFctrl* expressed by the angle β, and the maximum amount of change to correct the driving force or the braking force is restricted to the revised value Fctrl*.

In the time chart shown in FIG. 10, the broken line represents a change in the driving force or the braking force in case the driving/braking force control is carried out without restricting the changing amount and the changing rate of the driving force or the braking force. Meanwhile, the dashed-dotted line in FIG. 10 represents a change in the driving force or the braking force in case the driving/braking force control is carried out without taking into consideration the control delay. As can be seen from FIG. 10, in case of restricting the correction contents of the driving/braking force control, a substantive correction amount of the driving force or the braking force is reduced by thus taking into consideration the control response, that is, control delay. In this case, however, the driving force or the braking force can be corrected promptly in a large amount just after outputting a command of the correction amount. Therefore, deterioration in the turning performance resulting from a delay in outputting the correction amount can be prevented without providing an uncomfortable feeling to the driver. That is, the turning performance can be improved while improving the drivability.

As described, the control example shown in FIG. 8 is configured to detect the lateral jerk DGy (in the axle direction or width direction) of the vehicle Ve during turning of the vehicle Ve, and to correct the driving force or the braking force on the basis of the detected lateral jerk DGy. However, likewise the control examples shown in FIGS. 2 and 6, the above-explained example may be modified to carry out the driving/braking force control based on the detected lateral acceleration Gy of the vehicle Ve instead of the lateral jerk DGy.

Figure 11:
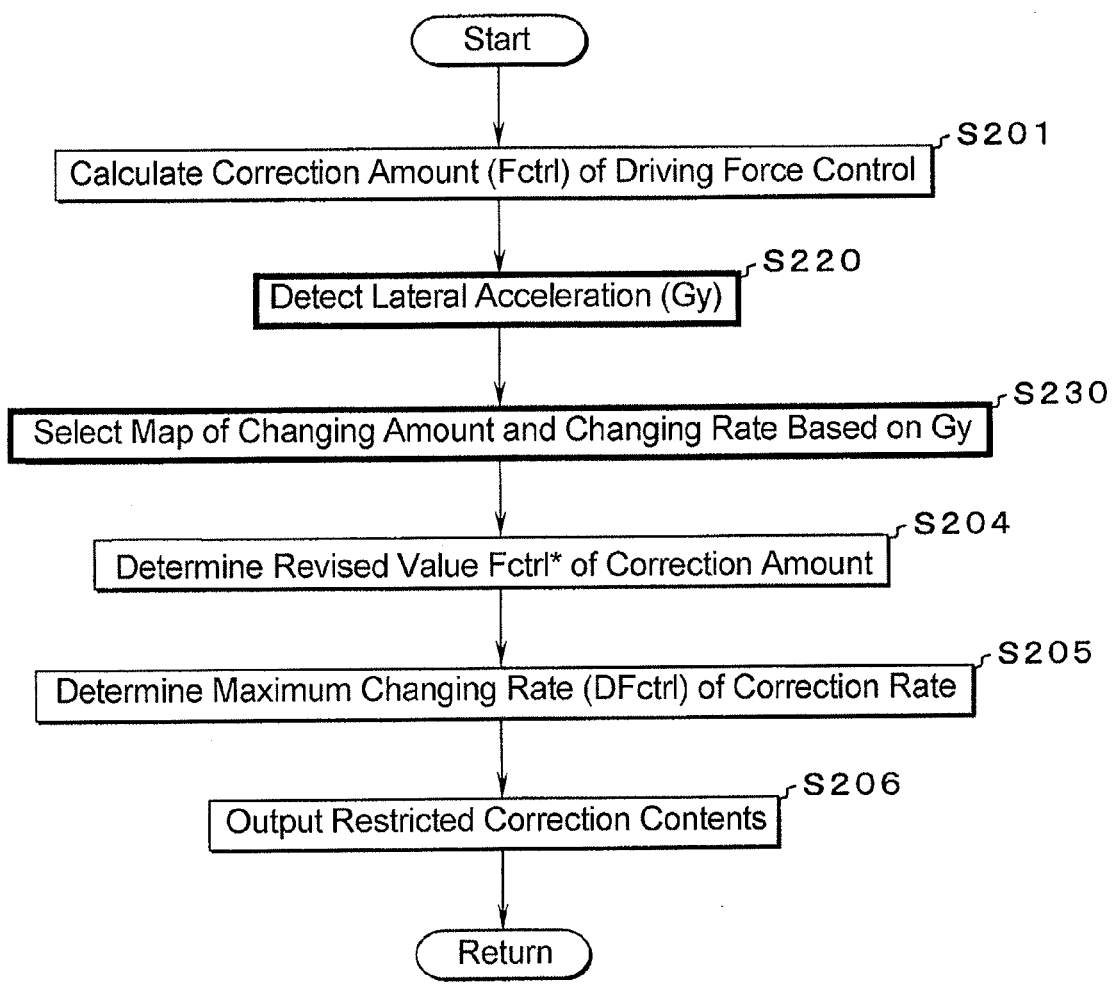
FIG. 11 is a flowchart explaining an example to carry out the driving force control shown in FIG. 8 based on the lateral acceleration of the vehicle.

FIG. 11 is a flowchart explaining an example of carrying out the above-explained driving/braking force control using the lateral acceleration Gy of the vehicle Ve instead of the lateral jerk DGy. In the control example shown in FIG. 11, step S220 corresponds to step S202 in FIG. 8, and step S230 corresponds to step S203 in FIG. 8. Specifically, the lateral acceleration Gy in the axle direction of the vehicle Ve is detected (at step S220). After thus detecting the lateral acceleration Gy of the vehicle Ve, a control map relating to the changing amount and the changing rate to correct the driving force or the braking force is selected based on the detected lateral acceleration Gy (at step S230). In this case, the control maps stipulating ranges of the changing amount and the changing rate to correct the driving force or the braking force in which the driver feels uncomfortable feeling are also prepared in advance for various lateral acceleration Gy based on experimentation. Therefore, at step S230, the control map corresponding to the lateral acceleration Gy detected at step S220 is selected from the control maps thus prepared. The control contents of the subsequent steps are identical to those of the flowchart shown in FIG. 8.

In case of thus carrying out the driving/braking force control using the lateral acceleration Gy instead of the lateral jerk DGy, an amount of information and number of calculations can be reduced so that the control itself can be simplified.

Thus, the vehicle control system according to the present invention is configured to correct the driving force or the braking force to stabilize the behavior of the vehicle Ve during turning of the vehicle Ve, and according to the examples shown in FIGS. 2 and 11, the lateral acceleration Gy of the vehicle Ve is detected to carry out the driving/braking force control. Then, the contents to correct the driving force or the braking force, that is, the changing amount Fctrl and the maximum changing rate DFctrl are determined based on the detected lateral acceleration Gy. Therefore, the driving force or the braking force of the vehicle Ve can be corrected in a manner to avoid generation of an unintentional significant longitudinal acceleration during turning of the vehicle Ve, so that an occurrence of shocks can be prevented and an uncomfortable feeling of the driver can be reduced. That is, the driving force or the braking force can be corrected by the maximum changing amount Fctrl and the maximum changing rate DFctrl within the range where the shocks will not generated and the driver will not feel any uncomfortable feeling. As a result, the behavior of the vehicle Ve can be stabilized during turning so that the turning performance of the vehicle Ve can be improved without generating shocks and without providing uncomfortable feeling to the driver.

Meanwhile, according to the examples shown in FIGS. 6 and 8, the lateral jerk DGy of the vehicle Ve is detected to carry out the driving/braking force control. Then, the changing amount Fctrl and the maximum changing rate DFctrl to correct the driving force or the braking force are determined based on the detected lateral jerk DGy. In case of thus determining the changing amount Fctrl and the maximum changing rate DFctrl to correct the driving force or the braking force of the vehicle Ve based on the lateral jerk DGy as a derivative of the lateral acceleration Gy with respect to time, the driving/braking force control can be carried out more accurately or sensitively in comparison with the case of carrying out the driving/braking force control based on the lateral acceleration Gy.

In addition, the changing amount Fctrl and the maximum changing rate DFctrl to correct the driving force or the braking force are revised taking into consideration the control response of the correction to be carried out. Specifically, the changing amount Fctrl and the maximum changing rate DFctrl to correct the driving force or the braking force are revised taking into consideration the control response such as a control delay and a dead time, thereby determining the revised value Fctrl* and the maximum changing rate DFctrl*.

More specifically, the changing amount Fctrl is reduced to be the revised value Fctrl*, and the maximum changing rate DFctrl is increased to be the maximum changing rate DFctrl*.

As a result, although a substantive correction amount is reduced, the speed to change the driving force or the braking force is increased. Therefore, an improvement of the turning performance can be expected from the beginning of the correction, and as a result, the turning performance of the vehicle can be improved. For this reason, deterioration in the improvement of the turning performance resulting from the inevitable control delay can be prevented without generating shocks and without providing uncomfortable feeling to the driver.

Here will be briefly explained a relation between the examples and the present invention. The functional means for carrying out steps S102 and S220 correspond to the "lateral acceleration detecting means" of the present invention, the functional means for carrying out steps S120 and S202 correspond to the "lateral jerk detecting means" of the present invention, and the functional means for carrying out steps S103, S104, S130, S203 to S206 and S230 correspond to the "driving/braking force correction means" of the present invention.

Figure 12:
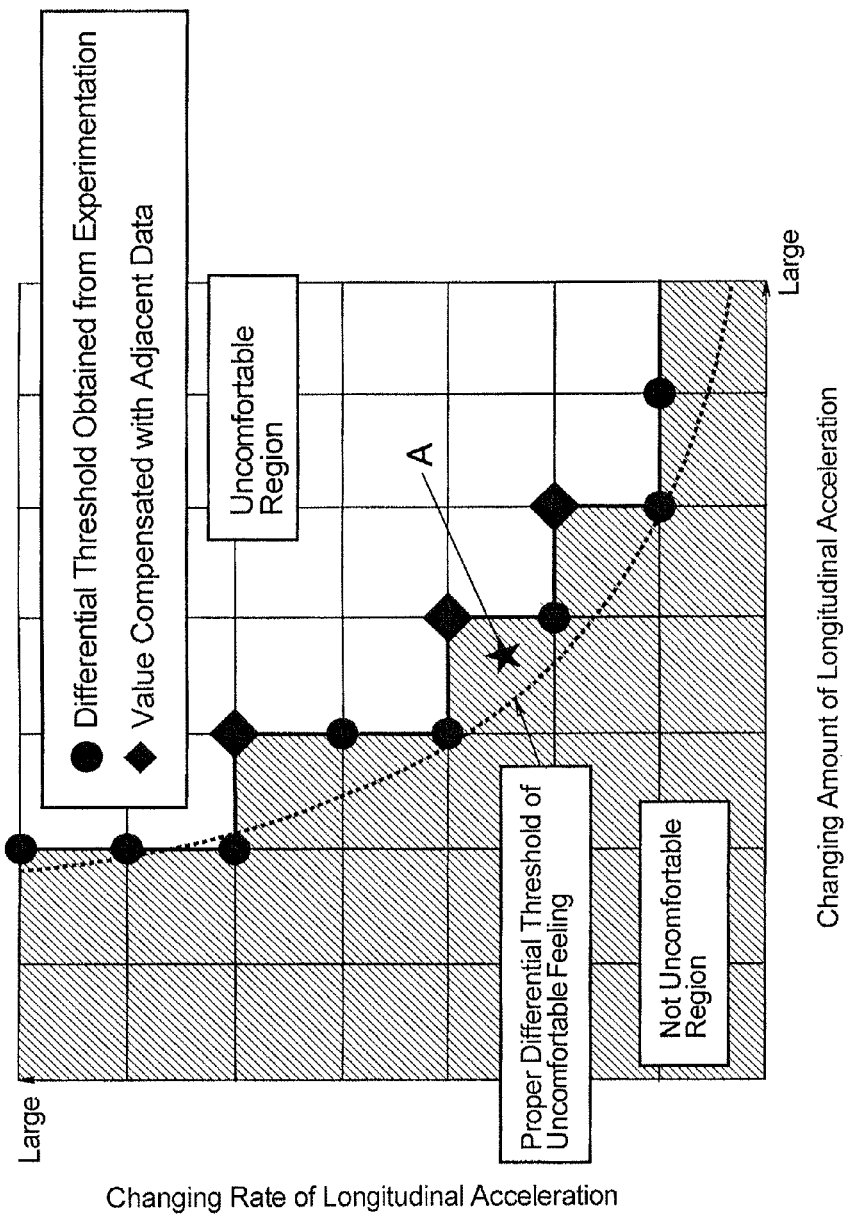
FIG. 12 is a view schematically showing a problem of a case in which the driving force control of the present invention is carried out with reference to the control map prepared in advance.

Thus, the vehicle control system according to the present invention is configured to improve the turning performance of the vehicle Ve by thus stabilizing the behavior of the vehicle Ve during turning without causing shocks and without providing uncomfortable feeling to the driver. For this purpose, the judgment for judging whether or not the driver feels uncomfortable feeling under the driving/braking force control is carried out with reference to the control maps shown in FIGS. 3, 4 and 9. However, in order to prepare those control maps, it is necessary to collect lots of data relating to a change in the actual driving force, acceleration, feeling of the driver etc. by carrying out experimentations, and this requires a long man-hour. In addition, as shown in FIG. 12, the boundary line between the "uncomfortable region" and the "not uncomfortable region" is drawn by compensating for missing data between collected data with the adjacent collected data. Therefore, for example, although the point A in FIG. 12 is situated in the "uncomfortable region", the point A may be judged erroneously as being situated in "not uncomfortable region". That is, even if the control is carried out on the basis of the judgment in which the driver does not feel an uncomfortable feeling, the driver may feel an uncomfortable feeling as a result of carrying out the correction.

Figure 13:
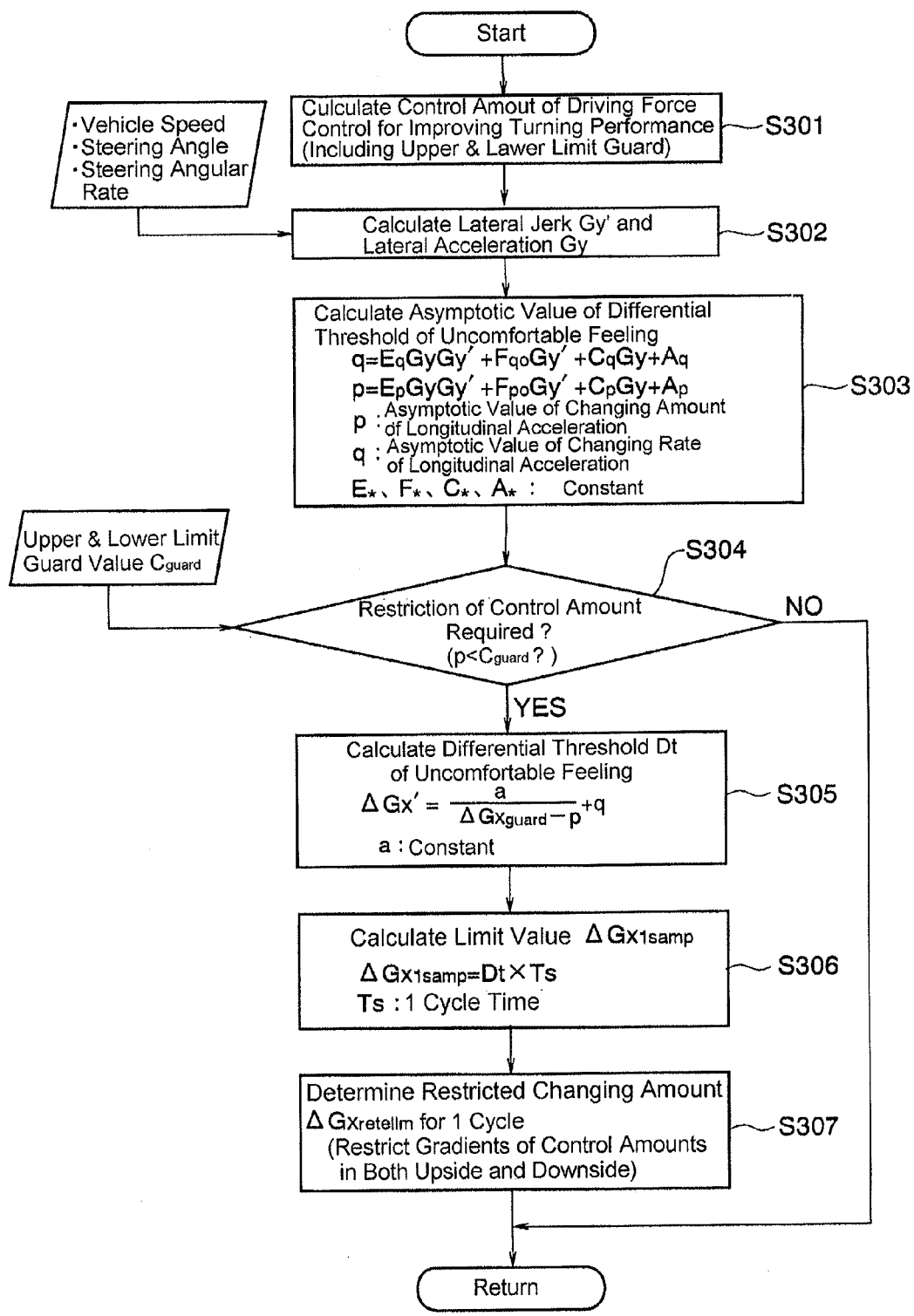
FIG. 13 is a flowchart explaining another example of the driving force control of the present invention, which is configured to judge an uncomfortable feeling by calculating a differential threshold of uncomfortable feeling without using the control map.
Figure 14:
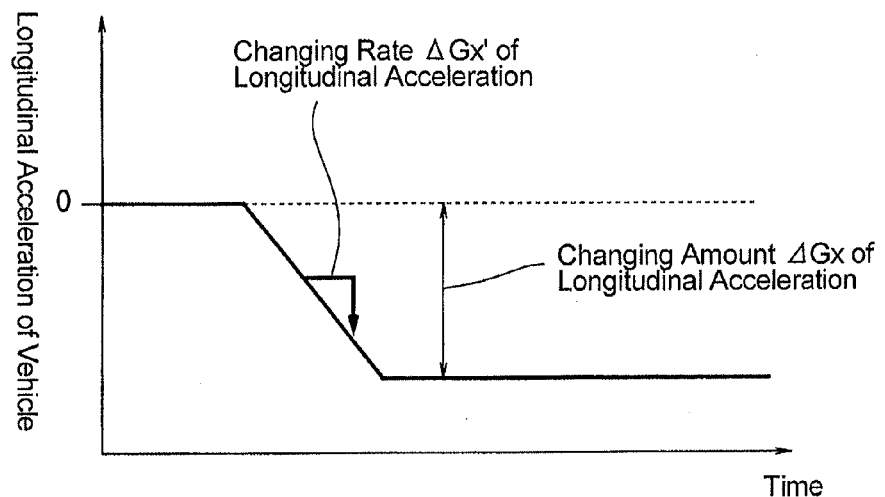
FIG. 14 is a graph indicating the changing amount and the changing rate of the longitudinal acceleration when carrying out the driving force control.

Therefore, in order to avoid such a misjudgment and to carry out the driving force control accurately, the vehicle control system according to the present invention is configured to carry out the below-explained control. FIG. 13 is a flowchart for explaining an example of such control, and the control shown in FIG. 13 is executed repeatedly in a predetermined short cycle. According to the control shown in FIG. 13, first of all, a control amount of the driving force for improving the turning performance is calculated. Specifically, a changing amount $\Delta Gx$ of the longitudinal acceleration and a changing rate $\Delta Gx'$ of the longitudinal acceleration shown in FIG. 14 are calculated, and an upper and lower limit guard value $C_{guard}$ of those control amounts is determined (at step S301). The above-mentioned upper and lower limit guard value $C_{guard}$ is a threshold which is determined taking into consideration the drivability of the vehicle Ve.

Then, the lateral acceleration Gy and the lateral jerk Gy' of the vehicle Ve are calculated based on a vehicle speed, a steering angle and a steering angular rate (at step S302). Specifically, the lateral acceleration Gy and the lateral jerk Gy' can be calculated using the following formulas:

$$Gy = [V^2/\{(1+kh \cdot V^2) \cdot L\}] \cdot (\delta/n)$$

$$Gy' = [V^2/\{(1+kh \cdot V^2) \cdot L\}] \cdot (\delta'/n)$$

where δ represents the steering angle, δ' represents the steering angular rate, n represents a steering gear ratio, V represents the vehicle speed, kh represents a stability factor and L represents a wheel base. In case of obtaining the lateral acceleration based on the sensor value as in the above-explained examples, the control may be delayed inevitably. Meanwhile, in case of thus obtaining the lateral acceleration Gy and the lateral jerk Gy' of the vehicle Ve by a calculation, the control can be carried out accurately without being delayed.

Figure 15:
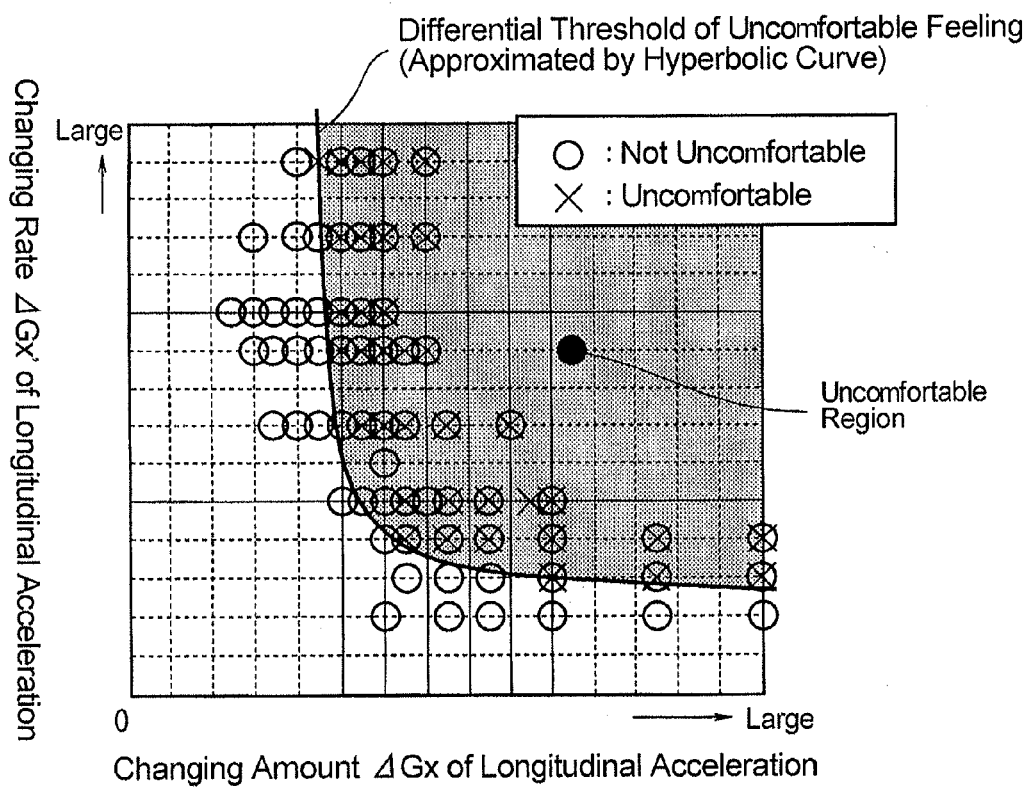
FIG. 15 is a view schematically showing the differential threshold of uncomfortable feeling approximated by the hyperbolic curve under the driving force control.

Then, an asymptotic value of a differential threshold of uncomfortable feeling is calculated (at step S303). Specifically, the differential threshold of uncomfortable feeling is a threshold, which is determined to judge whether or not the driver feels an uncomfortable feeling if the longitudinal acceleration is changed in accordance with the changing amount ΔGx and the changing rate ΔGx'. As shown in FIG. 15, the differential threshold of uncomfortable feeling can be determined approximately by a hyperbolic curve. Specifically, in FIG. 15, "o" represents plotted measured values at which the driver did not feel an uncomfortable feeling, and "x" represents plotted measured values at which the driver felt an uncomfortable feeling. A boundary line between those measured values represented by "o" and "x" can be approximated by the hyperbolic curve. Therefore, the hyperbolic curve is determined as the differential threshold of uncomfortable feeling.

Figure 16:
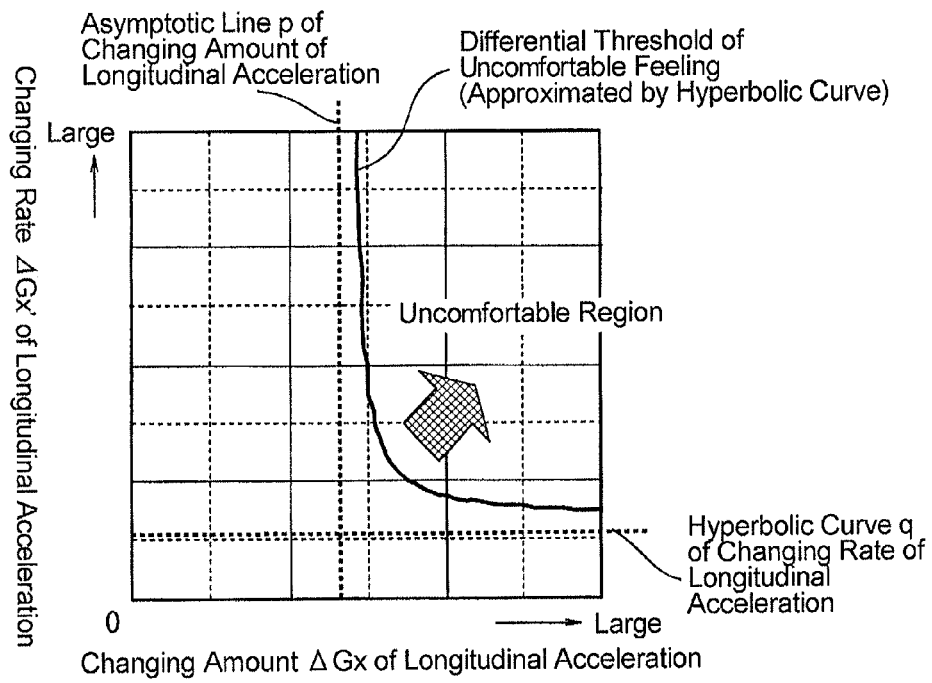
FIG. 16 is a view schematically showing an asymptotic value (i.e., an asymptotic line) of the differential threshold of uncomfortable feeling under the driving force control.

The hyperbolic curve representing the differential threshold of uncomfortable feeling can be expressed using the changing amount ΔGx and the changing rate ΔGx' of the longitudinal acceleration as the following expression:

$$\Delta Gx' = a/(\Delta Gx - p) + q$$

where "p" represents an asymptotic value of the changing amount ΔGx, and "q" represents an asymptotic value of the changing rate ΔGx' (provided that an asymptotic lines of the hyperbolic line are "ΔGx=p" and "ΔGx'=q" in FIG. 16). In addition, "a" in the above expression represents a constant set to approximate the hyperbolic curve to the measured value.

It is known that the asymptotic value p and the asymptotic value q are determined according to the lateral acceleration Gy and the lateral jerk Gy' of the vehicle Ve. Therefore, the asymptotic values p and q can be expressed by the flowing expressions:

$$p = E_P \cdot Gy \cdot Gy' + F_{P0} \cdot Gy' + C_{P0} \cdot + A_P; \text{ and}$$

$$q = E_q \cdot Gy \cdot Gy' + F_{q0} \cdot Gy' + C_{q0} \cdot + A_q$$

where $E_P$, $F_{P0}$, $C_{P0}$ and $A_P$, and $E_q$, $F_{q0}$, $C_{q0}$ and $A_q$ are predetermined constants.

Figure 17:
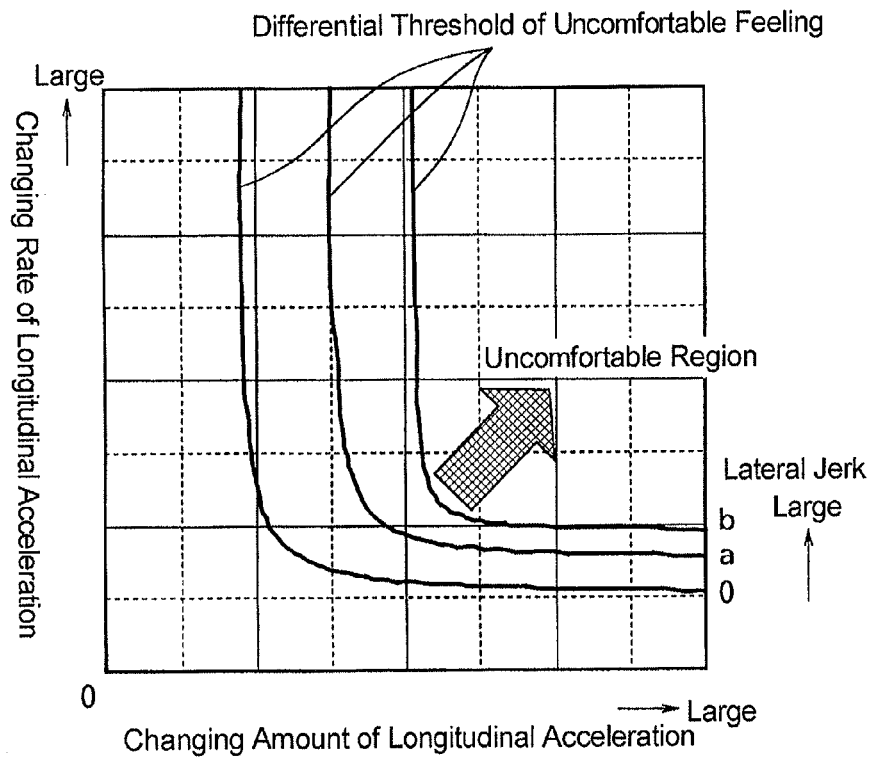
FIG. 17 is a view schematically showing a change in the differential threshold of uncomfortable feeling under three different levels of the lateral jerk.
Figure 18:
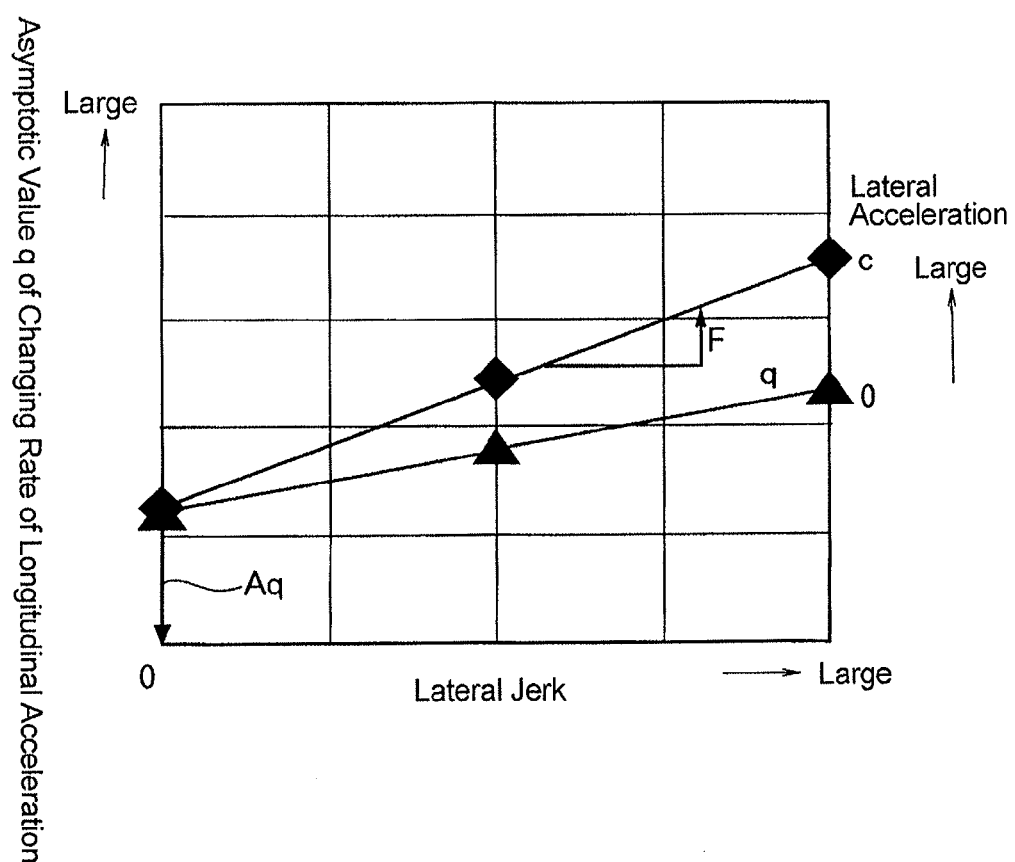
FIG. 18 is a graph indicating relations among the asymptotic value of the differential threshold of uncomfortable feeling, the lateral acceleration, and the lateral jerk under the driving force control.
Figure 19:
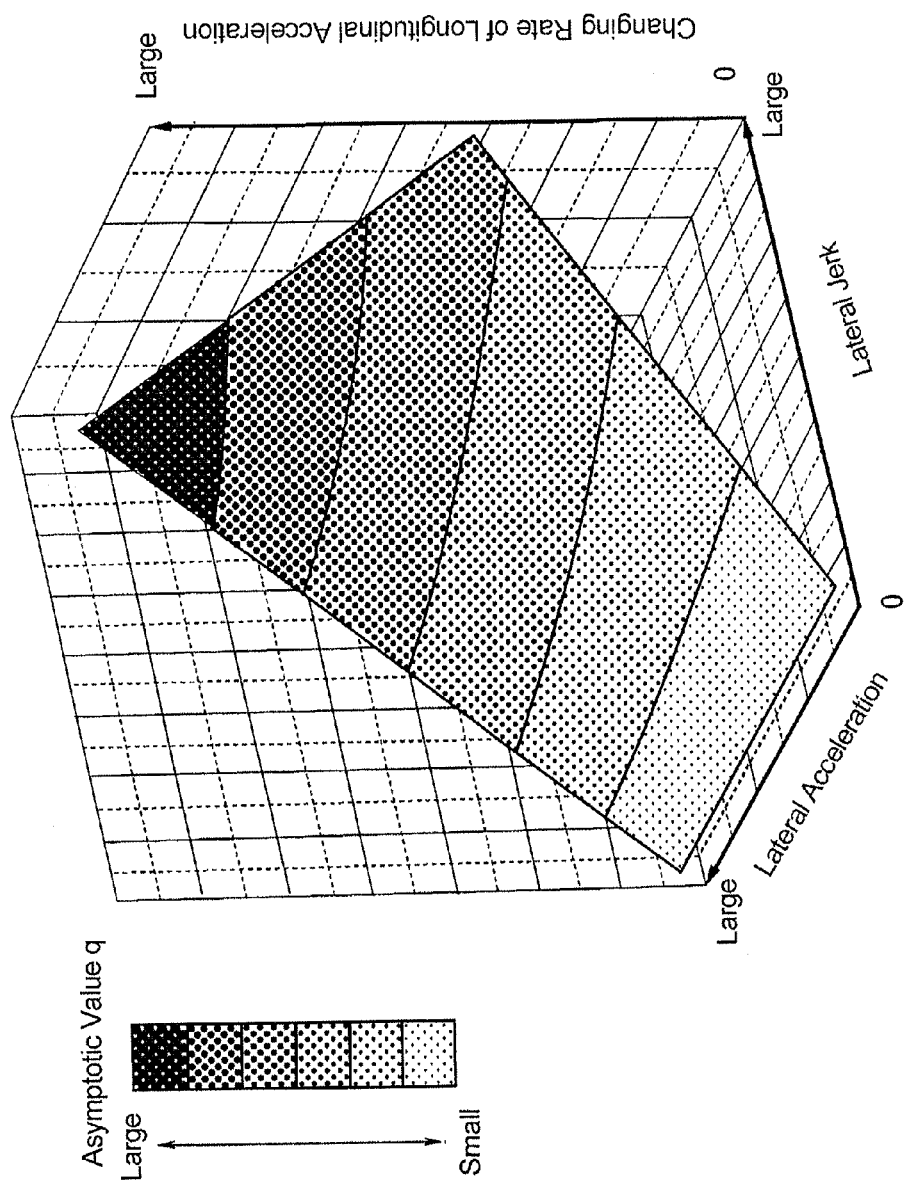
FIG. 19 is a view schematically showing relations among the asymptotic value of the differential threshold of uncomfortable feeling, the lateral acceleration and the lateral jerk, and the changing rate of the longitudinal acceleration, under the driving force control of the present invention.

Thus, those operational expressions for obtaining the asymptotic values p and q individually comprises: a term which is varied proportional to the lateral acceleration Gy; a term which is varied proportional to the lateral jerk Gy'; and a term which is varied proportional to a product of the lateral acceleration Gy and the lateral jerk Gy'. FIG. 17 shows a basis of the operational expressions for obtaining the asymptotic values p and q. Specifically, the differential thresholds of uncomfortable feeling at three different levels (0, a, and b) of the lateral jerk Gy', which have been determined based on experimental data are shown in FIG. 17. As can be seen from FIG. 17, the differential threshold of uncomfortable feeling is increased proportional to the lateral jerk Gy'. In addition, as can be seen from FIG. 18, the asymptotic value q is increased proportional individually to the lateral acceleration Gy and the lateral jerk Gy'. Further, FIG. 19 is a graphic showing relations among the changing rate ΔGx', the lateral acceleration Gy and the lateral jerk Gy', and the asymptotic value q. As can be seen from FIG. 19, the asymptotic value q is increased proportional to a product of the lateral acceleration Gy and the lateral jerk Gy'.

The above-mentioned constants $E_P$, $F_{P0}$, $C_{P0}$, $A_P$, $E_q$, $F_{q0}$, $C_{q0}$ and $A_q$ are constants obtained on the basis of experimentation. Specifically, the constant $A_P$ represents a value of the asymptotic value p under the condition in which the lateral acceleration Gy=0 and the lateral jerk Gy'=0, the constant $C_{P0}$ represents a change ratio of the asymptotic value p with respect to the lateral acceleration Gy under the condition in which the lateral jerk Gy'=0, the constant $F_{P0}$ represents a change ratio of the asymptotic value p with respect to the lateral jerk Gy' under the condition in which the lateral acceleration Gy=0, and the constant $E_P$ represents a change ratio of the asymptotic value p with respect to a product of the lateral acceleration Gy and the lateral jerk Gy'. Likewise, the constant $A_q$ represents a value of the asymptotic value q under the condition in which the lateral acceleration Gy=0 and the lateral jerk Gy'=0, the constant $C_{q0}$ represents a change ratio of the asymptotic value q with respect to the lateral acceleration Gy under the condition in which the lateral jerk Gy'=0, the constant $F_{q0}$ represents a change ratio of the asymptotic value q with respect to the lateral jerk Gy' under the condition in which the lateral acceleration Gy=0, and the constant $E_q$ represents a change ratio of the asymptotic value q with respect to a product of the lateral acceleration Gy and the lateral jerk Gy'.

Figure 20:
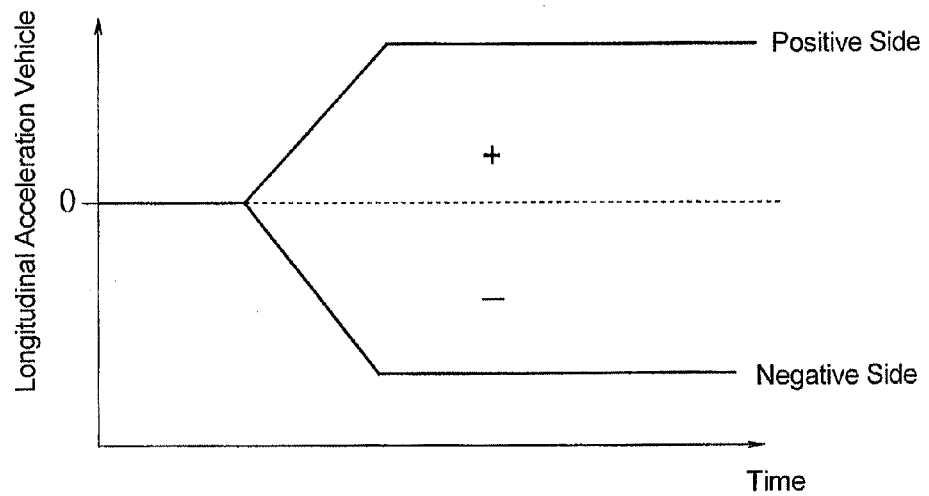
FIG. 20 is a view schematically showing a difference between the positive longitudinal acceleration and the negative longitudinal acceleration under the driving force control of the present invention.
Figure 21:
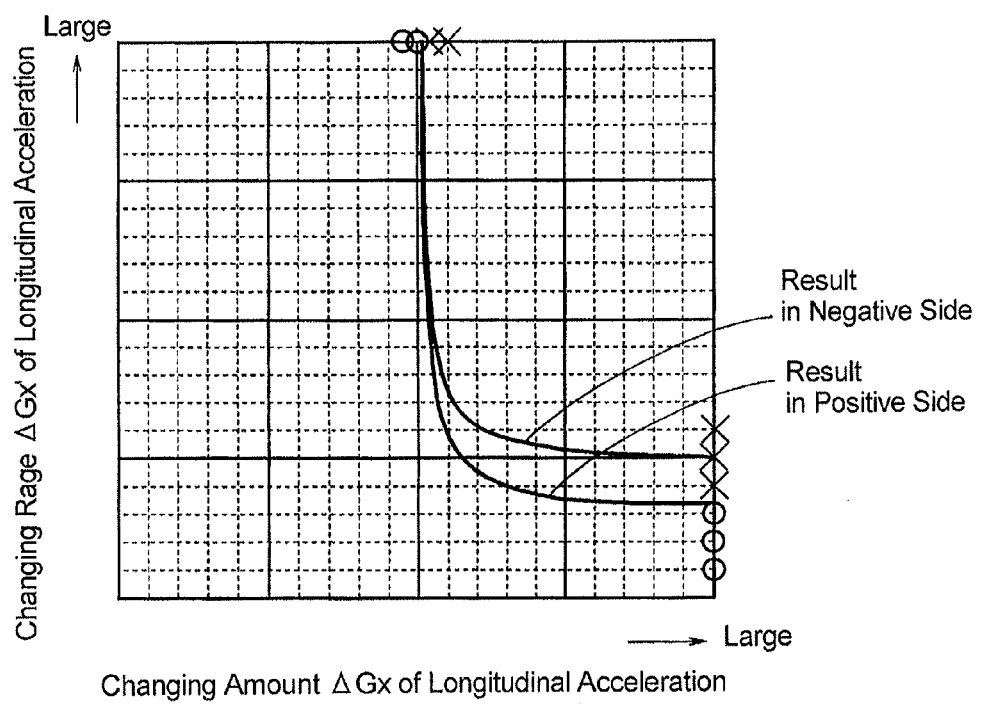
FIG. 21 is a view schematically showing a difference between the differential threshold of uncomfortable feeling calculated based on the positive longitudinal acceleration and the differential threshold of uncomfortable feeling calculated based on the negative longitudinal acceleration.

In addition, the asymptotic values p and q are calculated for each case in which the changing rate ΔGx' of the longitudinal acceleration is positive, and in which the changing rate ΔGx' of the longitudinal acceleration is negative. That is, as can be seen from FIG. 20, the longitudinal acceleration of the vehicle Ve is varied in both positive direction (i.e., to an accelerating side) and negative direction (i.e., to a decelerating side). Therefore, the differential threshold of uncomfortable feeling was obtained in both cases in which the longitudinal acceleration was positive and in which the longitudinal acceleration was negative, by measuring uncomfortable feeling of the driver in an above-explained manner. As a result, as indicated in FIG. 21, it was found that the differential threshold of uncomfortable feeling of the case in which the longitudinal acceleration is positive, and the differential threshold of uncomfortable feeling of the case in which the longitudinal acceleration is negative was different. Therefore, the driving force control of the present invention can be carried out more accurately by thus obtaining the asymptotic values p and q for both cases in which the longitudinal acceleration is positive and in which the longitudinal acceleration is negative.

After thus obtaining the asymptotic values p and q of the differential threshold of uncomfortable feeling, it is judged whether or not the control amount determined at step S301 is necessary to be restricted (at step S304). Specifically, the upper and lower limit guard value $C_{guard}$ determined as explained is compared with the asymptotic value p. That is, it is judged whether or not the following inequality is satisfied:

$$p < C_{guard}.$$

Figure 22:
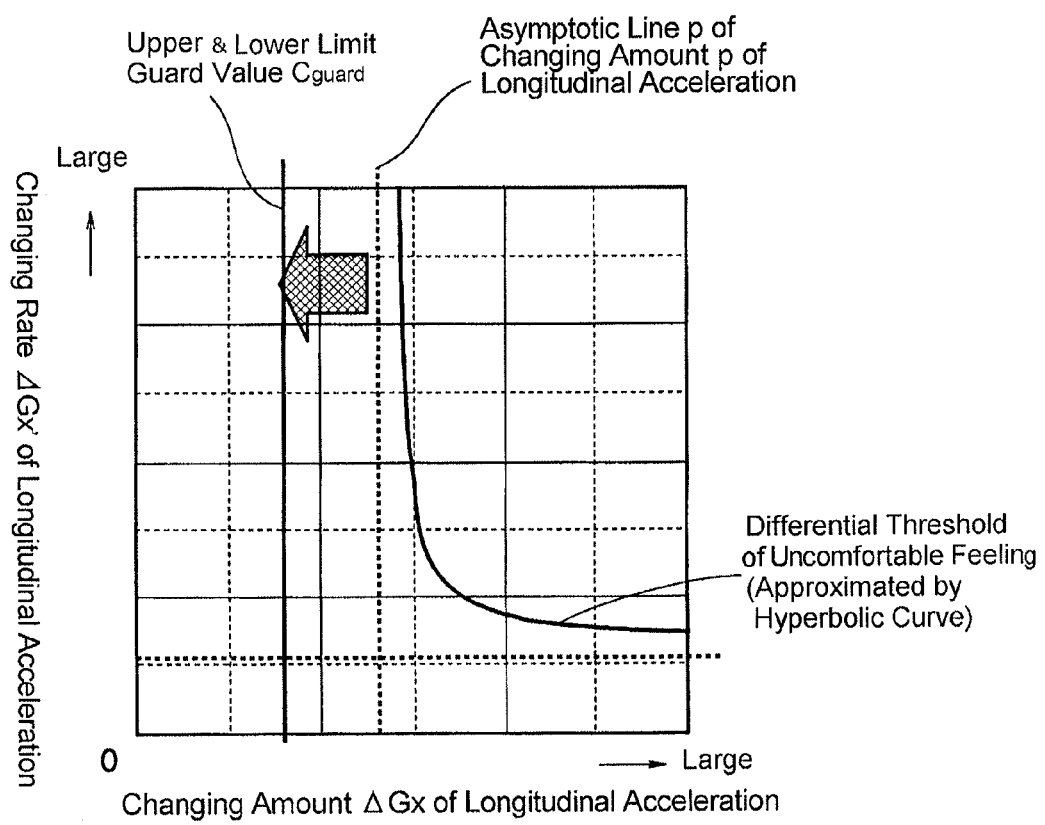
FIG. 22 is a view schematically showing an upper and lower limit guard value set under the driving force control.

In case the control amount is not necessary to be restricted, that is, in case the asymptotic value p is larger than the upper and lower limit guard value $C_{guard}$ so that the answer of step S304 is NO, the subsequent controls will not be carried out and the routing is returned. The situation of this case is shown in FIG. 22. In this case, as can be seen from FIG. 22, the upper and lower limit guard value $C_{guard}$ is smaller than the asymptotic value p. Therefore, it can be judged that the driver does not feel any uncomfortable feeling even if the changing rate ΔGx' of the longitudinal acceleration is increased as much as possible. Accordingly, in case the answer of step S304 is NO, it is unnecessary to carry out the subsequent controls for preventing uncomfortable feeling of the driver so that the routine is returned.

To the contrary, in case the control amount is necessary to be restricted, that is, in case the asymptotic value p is smaller than the upper and lower limit guard value $C_{guard}$ so that the answer of step S304 is YES, the routine advances to step S305 to restrict the changing rate $\Delta Gx'$ of the longitudinal acceleration and to calculate a differential threshold Dt of uncomfortable feeling. That is, the differential threshold of uncomfortable feeling which can be approximated by a hyperbolic curve as explained above is determined. In this case, specifically, the differential threshold Dt of uncomfortable feeling is calculated by assigning a changing rate $\Delta Gx_{gard}$ thus restricted to the above-explained expression of the hyperbolic curve "$\Delta Gx'=a/(\Delta Gx-p)+q$". As a result, the changing rate $\Delta Gx'$ thus restricted can be reflected on the differential threshold Dt of uncomfortable feeling.

For the same reason as the case of calculating the asymptotic values p and q, the differential threshold Dt of uncomfortable feeling is calculated for each case in which the changing rate $\Delta Gx'$ of the longitudinal acceleration is positive and in which the changing rate $\Delta Gx'$ of the longitudinal acceleration is negative. Therefore, the driving force control of the present invention can be carried out accurately.

Then, a limit value $\Delta Gx_{1samp}$ for one cycle is calculated (at step S306). Here, a definition of "one cycle" is a required time to complete one cycle of the routine of the flowchart shown in FIG. 13. Accordingly, the limit value $\Delta Gx_{1samp}$ for one cycle can be calculated by multiplying the differential threshold Dt of uncomfortable feeling calculated at step S305 by the required time to complete one cycle. Specifically, the limit value $\Delta Gx_{1samp}$ can be calculated using the following formula:

$$\Delta Gx_{1samp}=Dt \cdot Ts$$

where Ts represents the required time to complete one cycle.

After thus calculating the limit value $\Delta Gx_{1samp}$ for one cycle, the control amount calculated at step S301 is restricted by the limit value $\Delta Gx_{1samp}$ (at step S307). Specifically, a changing amount $\Delta Gx_{retelim}$ is determined by restricting the changing amount of the longitudinal acceleration in one cycle by the limit value $\Delta Gx_{1samp}$, and the correction contents thus restricted is outputted. That is, the changing amount $\Delta Gx$ for carrying out the correction of the driving force or the braking force is restricted by the limit value $\Delta Gx_{1samp}$. Then, the driving/braking force control is carried out on the basis of the correction contents thus restricted, and the routine is returned.

For the same reason as the case of calculating the asymptotic values p and q, and as the case of calculating the differential threshold Dt of uncomfortable feeling, the changing amount $\Delta Gx$ of the longitudinal acceleration is restricted for each case in which the changing rate $\Delta Gx'$ of the longitudinal acceleration is positive and in which the changing rate $\Delta Gx'$ of the longitudinal acceleration is negative. Therefore, the driving force control of the present invention can be carried out accurately.

Thus, according to the control example of the vehicle Ve explained with reference to the flowchart shown in FIG. 13, the differential threshold of uncomfortable feeling is determined to judge whether or not the driver feels an uncomfortable feeling under the driving force control. For this purpose, the differential threshold of uncomfortable feeling is determined by approximating to a predetermined continuous curved line on a coordinate system composed of coordinate axes representing the changing amount $\Delta Gx$ and the changing rate $\Delta Gx'$ of the longitudinal acceleration. Specifically, the differential threshold of uncomfortable feeling is approximated by the hyperbolic line extending along the asymptotic lines representing the predetermined changing amount $\Delta Gx$ and the predetermined changing rate $\Delta Gx'$ used for the correction. Therefore, according to the present invention, the differential threshold of uncomfortable feeling can be determined accurately by thus being approximated. For this reason, an impact on the driver resulting from carrying out the correction under the driving force control can be judged continuously and accurately. Consequently, the behavior of the vehicle can be stabilized appropriately.

As described, according to the present invention, the differential threshold of uncomfortable feeling can be obtained by the calculation using the operational expression expressing the hyperbolic curve. Therefore, it is unnecessary to prepare the control map in advance by collecting lots of data so that man-hour for carrying out experimentation for preparing the control map can be eliminated. In addition, since the control map is not used, it is unnecessary to store large quantity of data relating to the control map into a memory of the control unit. Therefore, a load on the memory of the electronic control unit 6 can be lightened significantly.

As also described, the operational expression expressing the hyperbolic curve approximated as the differential threshold of uncomfortable feeling is determined on the basis of the lateral acceleration Gy and the lateral jerk Gy' of the vehicle Ve, and the differential threshold of uncomfortable feeling can be calculated using the operational expression expressing the hyperbolic curve. Therefore, the differential threshold of uncomfortable feeling can be obtained accurately and promptly. For this reason, the behavior of the vehicle can be stabilized properly.

Here will be briefly explained a relation between the above-explained example and the present invention. The functional means for carrying out steps S302 and S303 correspond to the "differential threshold determining means" of the present invention, and the functional means for carrying out steps S304 to S307 correspond to the "driving/braking force correcting means" of the present invention.

In the above-explained examples, the vehicle Ve to which the vehicle control system according to the present invention is applied is a rear-drive vehicle configured to establish the driving force by transmitting the power of the prime mover 5 to the rear wheels 3 and 4. However, the vehicle control system may also be applied to a front-drive vehicle configured to establish the driving force by transmitting the power of the prime mover 5 to the front wheels 1 and 2. Alternatively, the vehicle control system may also be applied to a four-wheel-drive vehicle configured to establish the driving force by transmitting the power of the prime mover 5 to the front wheels 1 and 2 and to the rear wheels 3 and 4.

The invention claimed is:

1. A vehicle control system, which is configured to stabilize a behavior of a vehicle during turning by carrying out a correction to change a driving force or a braking force, comprising:
at least one of a lateral acceleration detecting means, which is configured to detect a lateral acceleration acting in an axle direction of the vehicle, and a lateral jerk detecting means, which is configured to detect a lateral jerk acting in an axle direction of the vehicle; and
a driving/braking force correcting means, which is configured to determine a maximum changing rate of the correction with respect to a changing amount of the correction based on the lateral acceleration or the lateral jerk in case of turning the vehicle, within a region determined in advance where a driver does not feel an uncomfortable feeling, wherein the driving/braking force correcting means includes a means configured to increase upper limit values of the changing amount and the changing rate in accordance with an increase in the lateral acceleration or the lateral jerk.

2. The vehicle control system as claimed in claim 1, wherein the driving/braking force correcting means includes a means configured to revise the changing amount and the changing rate to limit those values within a predetermined target region determined taking into consideration a control response to carry out the correction.

3. The vehicle control system as claimed in claim 2, wherein the driving/braking force correcting means includes a means configured to revise the changing amount to reduce while revising the changing rate to increase.

4. The vehicle control system as claimed in claim 1, further comprising:

a longitudinal acceleration detecting means, which detects a longitudinal acceleration of the vehicle;

a differential threshold determining means, which is configured to determine a differential threshold to judge whether or not the driver feels an uncomfortable feeling when carrying out the correction, by approximating the differential threshold to a predetermined continuous curve on a coordinate system composed of coordinate axes representing a changing amount of the longitudinal acceleration of the correction and a changing rate of the longitudinal acceleration of the correction; and the driving/braking force correcting means includes a means configured to determine the changing amount of the longitudinal acceleration and the changing rate of the longitudinal acceleration in a manner to limit those values within the region where the driver does not feel an uncomfortable feeling by the differential threshold.

5. The vehicle control system as claimed in claim 4, wherein the curve includes a hyperbolic curve extending along a linear asymptotic line representing the predetermined changing amount of the longitudinal acceleration and a linear asymptotic line representing the predetermined changing rate of the longitudinal acceleration.

6. The vehicle control system as claimed in claim 5, wherein the differential threshold determining means includes a means configured to calculate the predetermined changing amount of the longitudinal acceleration and the predetermined changing rate of the longitudinal acceleration of the asymptotic lines based on the lateral acceleration and/or lateral jerk.

7. A vehicle control system, which is configured to stabilize a behavior of a vehicle during turning by carrying out a correction to change a driving force or a braking force, comprising:

one of a lateral acceleration detector, which is configured to detect a lateral acceleration acting in an axle direction of the vehicle and a lateral jerk detector, which is configured to detect a lateral jerk acting in an axle direction of the vehicle; and a driving/braking force corrector, which is configured to determine a maximum changing rate of the correction with respect to a changing amount of the correction based on the lateral acceleration or the lateral jerk in case of turning the vehicle, within a region determined in advance where a driver does not feel an uncomfortable feeling;

wherein the driving/braking force corrector includes a corrector configured to increase upper limit values of the changing amount and the changing rate in accordance with an increase in the lateral acceleration or the lateral jerk.

* * * * *